United States Patent [19]

Kimoto et al.

[11] Patent Number: 5,272,723
[45] Date of Patent: Dec. 21, 1993

[54] WAVEFORM EQUALIZER USING A NEURAL NETWORK

[75] Inventors: Takashi Kimoto, Yokohama; Kazuo Asakawa, Kawasaki; Kazuo Kawabata, Kawasaki; Yasuyuki Oishi, Kawasaki; Eisuke Fukuda, Yokohama; Takeshi Takano, Ushiku, all of Japan

[73] Assignee: Fujitsu Limited, Kawasaki, Japan

[21] Appl. No.: 691,871

[22] Filed: Apr. 26, 1991

[30] Foreign Application Priority Data

| | | | |
|---|---|---|---|
| Apr. 26, 1990 | [JP] | Japan | 2-111194 |
| May 1, 1990 | [JP] | Japan | 2-115477 |
| May 1, 1990 | [JP] | Japan | 2-115478 |
| May 1, 1990 | [JP] | Japan | 2-115479 |

[51] Int. Cl.⁵ .............................. H03H 7/30
[52] U.S. Cl. .................. 375/11; 364/724.19
[58] Field of Search ............ 375/11, 12, 13, 14; 333/18; 364/724.19, 724.2

[56] References Cited

U.S. PATENT DOCUMENTS

| | | | |
|---|---|---|---|
| 3,649,916 | 3/1972 | Winters | 375/12 |
| 4,044,381 | 8/1977 | Shimano et al. | 358/167 |
| 4,881,240 | 11/1989 | Critchlow et al. | 375/13 |
| 5,005,184 | 4/1991 | Amano et al. | 375/14 |
| 5,115,452 | 5/1992 | Cupo | 375/14 |

FOREIGN PATENT DOCUMENTS 0052362  5/1982  European Pat. Off. .

OTHER PUBLICATIONS

Gibson, G. J. et al., "Multilayer Perceptron Structures Applied to Adaptive Equalisers for Data Communications", IEEE International Conference on Acoustic, Speech and Signal Processing, *IEEE*, vol. 2, May 23, 1989, pp. 1183–1186.

de Veciana, G. et al., "Neural Net Based Continuous Phase Modulation Receivers", IEEE International Conference on Communications, *IEEE*, vol. 2, Apr. 15, 1990, pp. 419–423.

Garcia-Gomez, R. et al., "Adaptive Receivers for Removing Linear and Non-Linear Intersymbol Interference by Mean of Time Delay Neural Nets", *IEEE* International Conference on Acoustic, Speech and Signal Processing, IEEE, vol. 4, May 23, 1989, pp. 2368–2371.

Williams, R. J., "On the Use of Backpropagation in Associative Reinforcement Learning", IEEE International Conference on Neural Networks, *IEEE*, vol. 1, Jul. 24, 1988, pp. 263–270.

Winter, R. et al., "Madaline Rule II: A Training Algorithm for Neural Networks", IEEE International Conference on Neural Networks, *IEEE*, vol. 1, Jul. 24, 1988, pp. 401–408.

European Search Report, The Hague, Jul. 30, 1992.

*Primary Examiner*—Curtis Kuntz
*Assistant Examiner*—Vijay Shankar
*Attorney, Agent, or Firm*—Staas & Halsey

[57] ABSTRACT

A waveform equalizer for equalizing a distorted signal, contains a sampling unit, a time series generating unit, and an equalization neural network unit. The sampling unit samples the level of a distorted signal at a predetermined rate. The time series generating unit serially receives the sampled level and outputs in parallel a predetermined number of the levels which have been last received. The equalization neural network unit receives the outputs of the time series generating unit, and generates an equalized signal of the distorted signal based on the outputs of the time series generating unit using a set of equalization network weights which are preset therein. The waveform equalizer may further contain a distortion characteristic detecting unit, an equalization network weight holding unit, and a selector unit. The distortion characteristic detecting unit detects a distortion characteristic of the distorted signal. The equalization network weight holding unit holds a plurality of sets of equalization network weights each for being set in the equalization neural network unit. The selector unit selects one of the plurality of sets of equalization network weights according to the distortion characteristic which is detected in the distortion characteristic detecting unit, and supplies the selected set in the equalization neural network unit to set the selected set therein.

50 Claims, 15 Drawing Sheets

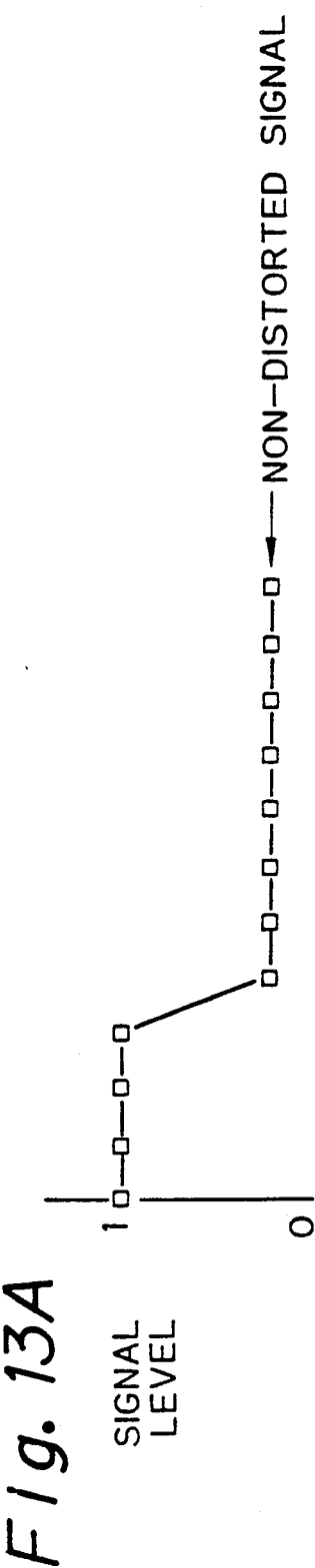
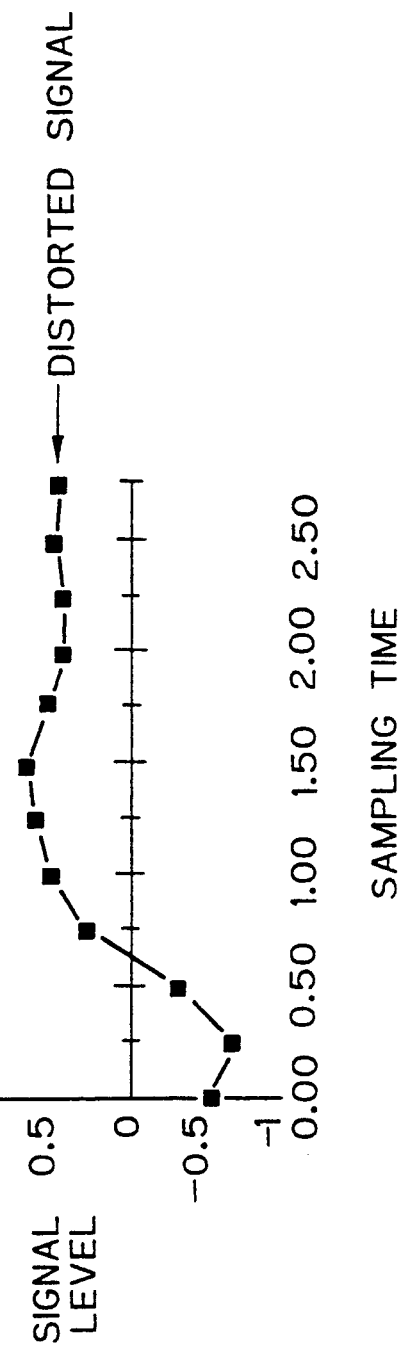
Fig. 13A
Fig. 13B (1) A=1.0, τ=0.1
(2) A=1.0, τ=0.2
(3) A=1.0, τ=0.3
(4) A=1.0, τ=0.4
(5) A=1.0, τ=0.5
(6) A=1.0, τ=0.6
(7) A=1.0, τ=0.7
(8) A=1.0, τ=0.8

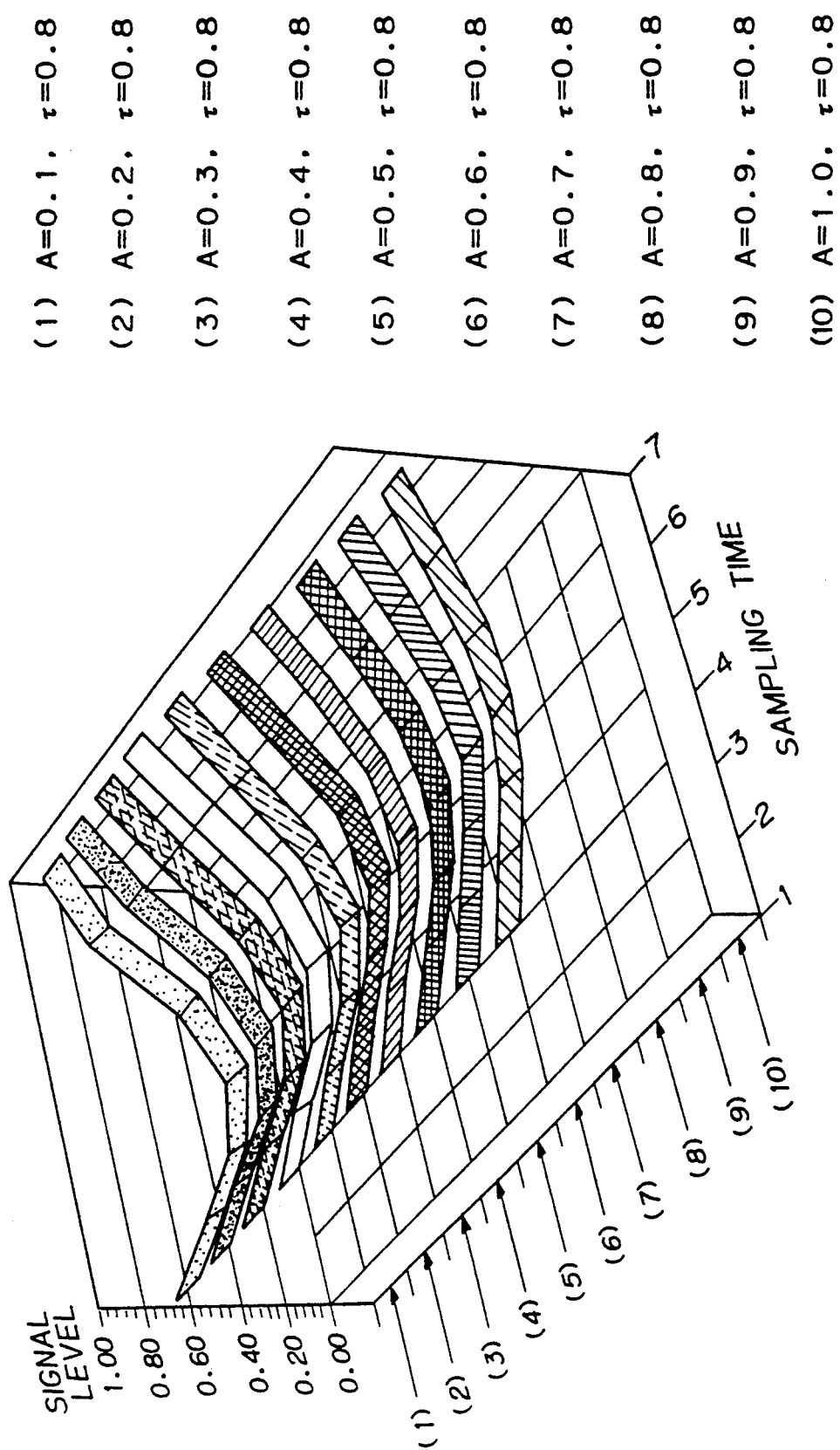

WAVEFORM EQUALIZER USING A NEURAL NETWORK

CROSS REFERENCE TO RELATED APPLICATION

This application is related to Copending application Ser. No. 07/474,055, filed on Apr. 30, 1990, and Kazuo Asakawa, one of the inventors of the copending application is one of the inventors of the subject application.

BACKGROUND OF THE INVENTION

(1) Field of the Invention

The present invention relates to a waveform equalizer using a neural network, and a system for supervising and controlling the equalizer.

In the field of data communications, signals suffer distortion in their waveforms during transmission thereof, and highly precise equalization of the signals is required when the signals are received to prevent an error. The distortion is often non-linear. In addition, in particular, in the field of radio communications and mobile communications, the distortion may vary time-dependently. Since the Baud rate in recent data communication is increasing, a very high speed response is required to eliminate the distortion. Thus, a waveform equalizer is required to adaptively respond to time-dependently varying distortion including non-linear distortion in a waveform of a received signal with very high speed, to realize a highly precise equalization of the signal.

(2) Description of the Related Art

FIG. 1 shows a typical construction of a transversal type adaptive filter which is conventionally used for equalizing waveforms of received signals. The transversal type adaptive filter comprises: a tapped delay line holding a time series of data which is sampled from a received signal which is to be equalized; adaptive multipliers which multiply the time series of data by respective weight coefficients; and an adder which calculates a sum of the outputs of the multipliers. The weight coefficients are adaptively determined to realize an equalization of the received signal. However, the waveform equalizer using the transversal type adaptive filter cannot eliminate the non-linear distortion in the received signal.

SUMMARY OF THE INVENTION

An object of the present invention is to provide a waveform equalizer which can adaptively respond to time-dependently varying distortion including non-linear distortion in a waveform of a received signal, and can realize high-speed, highly precise equalization of the signal.

According to the first aspect of the present invention, there is provided a waveform equalizer for equalizing a distorted signal, comprising: a sampling unit for sampling a level of the distorted signal at a predetermined rate; a time series generating unit for serially receiving the sampled level and outputting in parallel a predetermined number of the levels which have been last received; and an equalization neural network unit for receiving the outputs of the time series generating unit, and generating an equalized signal of the distorted signal based on the outputs of the time series generating unit using a set of equalization network weights which are preset thereto.

According to the second aspect of the present invention, there is provided a detector and waveform equalizer for detecting and equalizing a modulated and distorted signal, comprising: a sampling unit for sampling a level of the modulated and distorted signal at a predetermined rate; a time series generating unit for serially receiving the sampled level and outputting in parallel a predetermined number of the levels which have been last received; and a demodulation/equalization neural network unit for receiving the outputs of the time series generating unit, and generating a demodulated and equalized signal of the modulated and distorted signal based on the outputs of the time series generating unit using a set of demodulation/equalization network weights which are preset therein.

According to the third aspect of the present invention, there is provided a waveform equalizer comprising: in addition to the construction of the first or second aspect of the present invention; a distortion characteristic detecting unit for detecting a distortion characteristic of the distorted signal, an equalization network weight holding unit for holding a plurality of sets of equalization network weights each for being set in the equalization neural network unit; and a selector unit for selecting one of the plurality of sets of equalization network weights according to the distortion characteristic which is detected in the distortion characteristic detecting unit, and supplying the selected set to the equalization neural network unit to set the selected set therein.

According to the fourth aspect of the present invention, there is provided a waveform equalizer comprising: in addition to the construction of the third aspect of the present invention; an optimum equalization network weight obtaining unit for obtaining an optimum set of the equalization network weights for each distortion characteristic so that the equalization neural network unit outputs a best equalized signal for a distorted signal having that distortion characteristic when the optimum set of the equalization network weights is preset in the equalization neural network unit, and supplying the obtained set to the equalization network weight holding unit so that the equalization network weight holding unit stores therein the set of equalization network weights obtained for each of the distortion characteristics.

According to the fifth aspect of the present invention, there is provided a waveform equalizer comprising the same construction as the fourth aspect of the present invention, and the above optimum equalization network weight obtaining unit comprising: a model distorted signal generating unit for generating a plurality of model distorted signals each having a certain distortion characteristic, and supplying the model distorted signals to the equalization neural network unit; an equalization network weight setting unit for setting a set of equalization network weights in the equalization neural network unit; an output monitoring unit for monitoring the output of the equalization neural network unit; an equalization network weight modifying unit for modifying the set of equalization network weights which are set by the equalization network weight setting unit in the equalization neural network unit; a learning control unit for controlling the equalization network weight setting unit and the equalization network weight modifying unit based on the output of the equalization neural network unit to obtain the optimum set of the equalization network weights; and a presetting unit for presetting the obtained optimum set of the equalization network weights in the equalization neural network unit.

The above operation may be carried out by using a simulated equalization neural network unit instead of the above equalization neural network unit. The simulated equalization neural network unit receives the above model distorted signals which are to be applied to the equalization neural network unit, and simulates the operation of the equalization neural network unit, in the above operation in the fifth aspect of the present invention.

BRIEF DESCRIPTION OF THE DRAWINGS

In the drawings:

FIG. 13 is a diagram showing waveforms of the non-distorted signal corresponding to the pattern "10" and an example of a model distorted signal corresponding to the non-distorted signal;

FIGS. 14 and 15 are diagrams showing the waveforms of the distorted signals which are obtained for the data pattern "10" and the various combinations of values of the amplitude distortions A and the delay distortions $\tau$.

DESCRIPTION OF THE PREFERRED EMBODIMENTS

(1) First Embodiment

Figure 1:
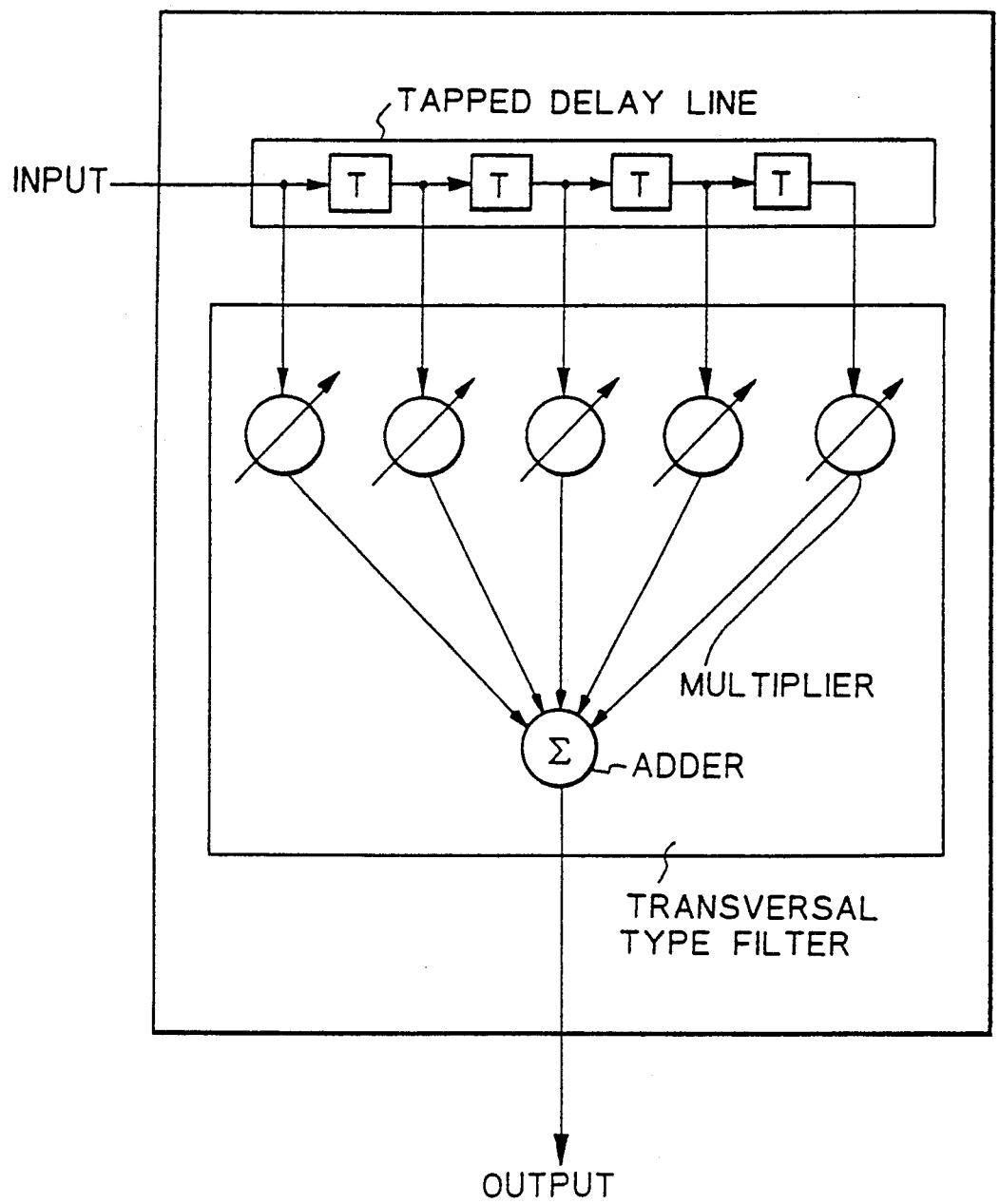
FIG. 1 is a diagram showing a typical construction of a transversal type adaptive filter which is conventionally used for equalizing waveforms of received signals.
Figure 2:
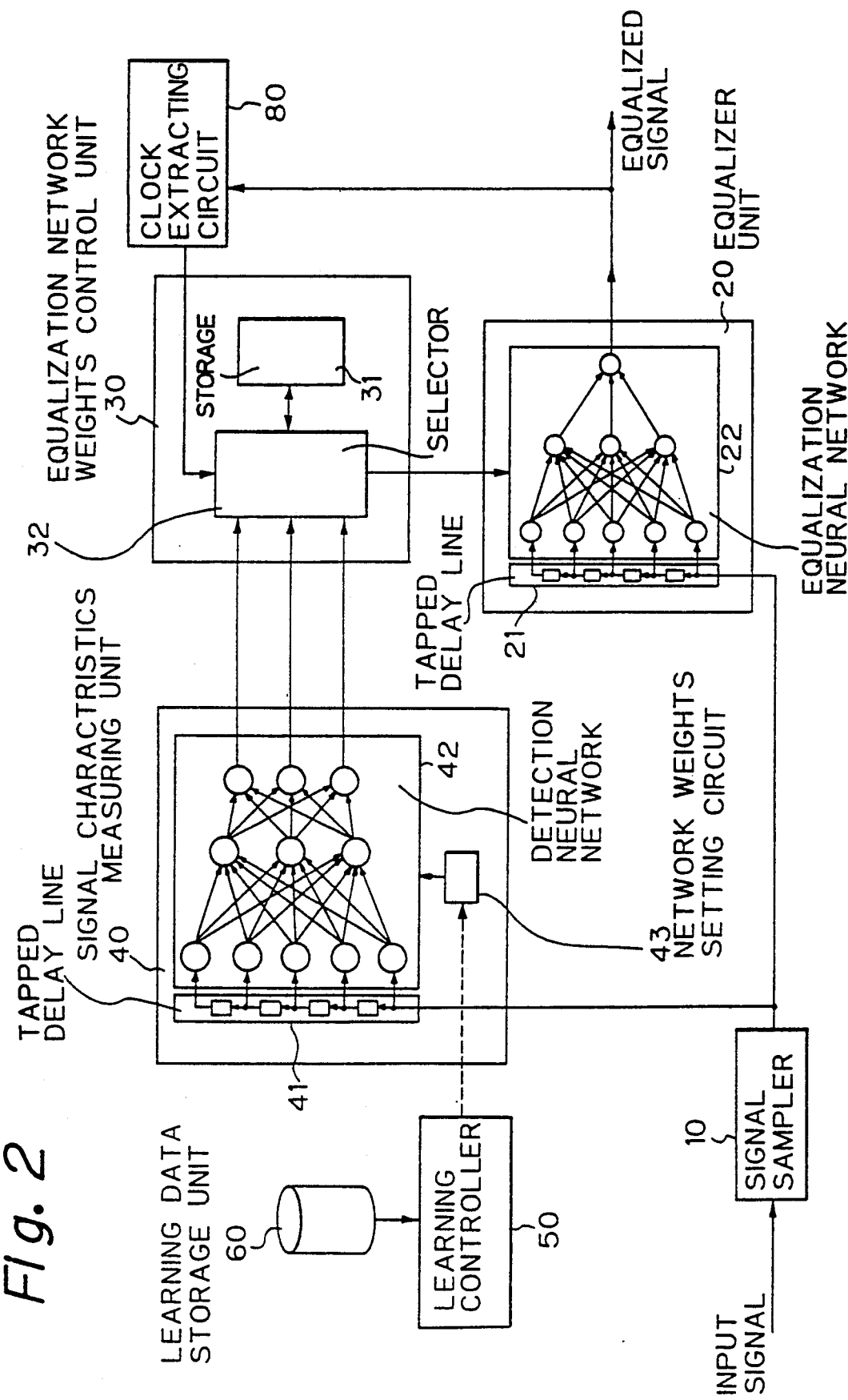
FIG. 2 is a diagram showing the construction of the first embodiment of the present invention.

FIG. 2 (signal input)

FIG. 2 is a diagram showing the construction of the first embodiment of the present invention. In FIG. 2, reference numeral 10 denotes a signal sampler unit, 20 denotes an equalizer unit, 21 and 41 each denote a tapped delay line, 22 denotes an equalization neural network, 30 denotes an equalization network weights control unit, 31 denotes an equalization network weights storage, 32 denotes an equalization network weights selector, 40 denotes a signal characteristics measuring unit, 42 denotes a detection neural network, 43 denotes a network weights setting circuit, 50 denotes a learning controller, 60 denotes a learning data storage unit, and 80 denotes a clock extracting circuit.

In the signal sampler unit 10, an input signal which may include distortion and is to be equalized, is sampled at a predetermined rate. Hereinafter, the input signal which may contain distortion may be referred to as a distorted signal. The sampled level of the input signal is serially supplied to the tapped delay line 21 in the equalizer unit 20, and the tapped delay line 41 in the signal characteristics measuring unit 40. The tapped delay lines 21 and 41 respectively realize the aforementioned time series generating unit, and serially successively receive the sampled levels and outputs in parallel a predetermined number (five in FIG. 2) of the sampled levels which have been last received, to the equalization neural network 22 and the detection neural network 42, respectively.

Figure 3:
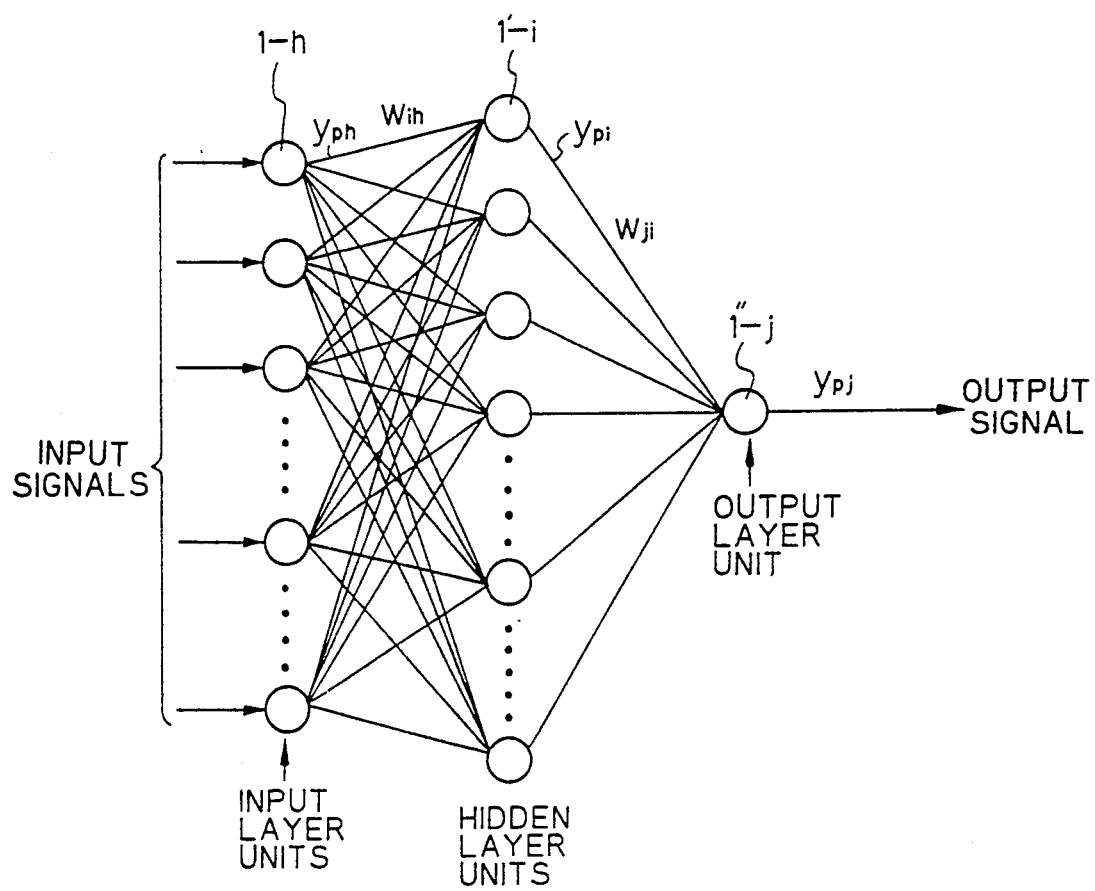
FIG. 3 is a block diagram showing input-output connections between input layer units, hidden layer units, and output layer units in a three layer unit neural network.

FIG. 3 (neural network)

FIG. 3 is a block diagram showing input-output connections between input layer units and hidden layer units, and between the hidden layer units and the output layer units in a three layer unit neural network. Each of the equalization neural network 22 and the detection neural network 42 has a construction, for example, as shown in FIG. 3. As shown in FIG. 3, the neural network 22 or 42 is a hierarchical network which comprises a predetermined number of input layer units 1—h (h=1, 2, ... ), a plurality of hidden layer units 1'—i (i=1, 2, ... ), and at least one output layer unit 1"—j (j=1, 2, ... ). The input layer units in each of the equalization neural network 22 and the detection neural network 42 receive the outputs of the corresponding tapped delay line 21 or 41, each of the hidden layer units inputs the values received at a predetermined combination of the input layer units and outputs a value which is a function of the inputs thereof, and each of the output layer units inputs the outputs of a predetermined combination of the hidden layer units and outputs a value which is a function of the inputs thereof. The network weights $W_{ih}$ and $W_{ji}$ are respectively set in the hidden layer units and the output layer units, and each of the hidden layer units and the output layer unit comprises a linear combination unit for obtaining a linear combination of the inputs thereof using the set of the equalization network weights $W_{ih}$ and $W_{ji}$, and a non-linear function unit for obtaining a non-linear function of the linear combination.

Figure 4:
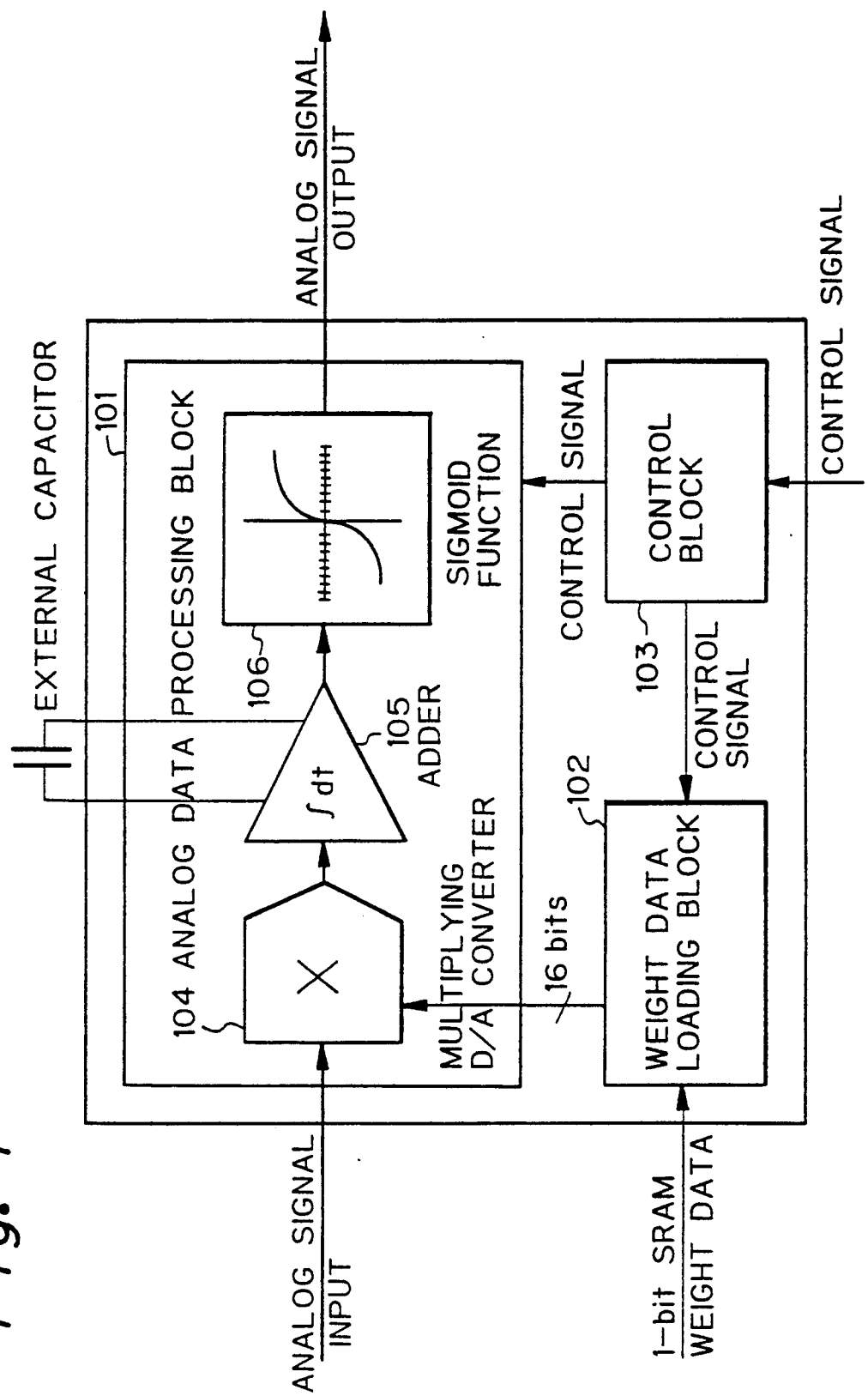
FIG. 4 is a block diagram of an analog neuroprocessor.

FIG. 4 (analog neuroprocessor)

Each of the hidden layer units and the output layer unit in the neural network can be realized by an analog neuroprocessor, for example, as shown in FIG. 4. The analog neuroprocessor of FIG. 4 comprises an analog data processing block 101, a weight data loading block 102, and a control block 103. The analog data processing block 101 comprises a multiplying digital to analog converter 104, an adder 105, and a Sigmoid function converter 106. The multiplying digital to analog converter 104 and the adder 105 calculate a linear combination of its serial input signals $y_{ph}$ or $y_{pi}$ (p, h, i=1, 2, ... ) thereof using the set of the network weights $W_{ih}$ or $W_{ji}$. The above-mentioned (equalization or detection) network weights are supplied to the multiplying digital to analog converter 104 through the weight data loading block 102. The analog input signals are all or a part of the parallel outputs of tapped delay line 21 or 41 in the equalizer unit 20 and the tapped delay line 41 in the signal characteristics measuring unit 40. For example, the network weights $W_{i1}$, $W_{i2}$, ... $W_{in}$, are serially supplied to the multiplying digital to analog converter 104 in the analog neuroprocessor which is used for a hidden layer unit 1'−h, and analog input signals yph corresponding to the network weights $W_{i1}$, $W_{i2}$, ... $W_{in}$ are serially supplied to the multiplying digital to analog converter 104 so that the inputs of the analog input signals yph respectively coincide with the inputs of the corresponding network weights $W_{i1}$, $W_{i2}$, ... $W_{in}$. The multiplying digital to analog converter 104 serially outputs an analog signal having an amplitude $y_{ph} \cdot W_{ih}$ which is proportional to the multiplication of respective pairs of amplitudes of the above analog input signals and the corresponding network weights. The adder 105 serially receives the above analog output signals from the multiplying digital to analog converter 104, and accumulates the received signals to obtain a signal having an amplitude which is proportional to the linear combination $\Sigma y_{ph} \cdot W_{ih}$. The Sigmoid function converter 106 transforms the output of the adder 105 in accordance with the Sigmoid function. The Sigmoid function is a non-linear function which is continuous and has a gradient equal to or more than zero. The analog output of the Sigmoid function converter 106 is output from the analog processing unit 101 of the analog neuroprocessor of FIG. 4, under the control of the control block 103.

Figure 5:
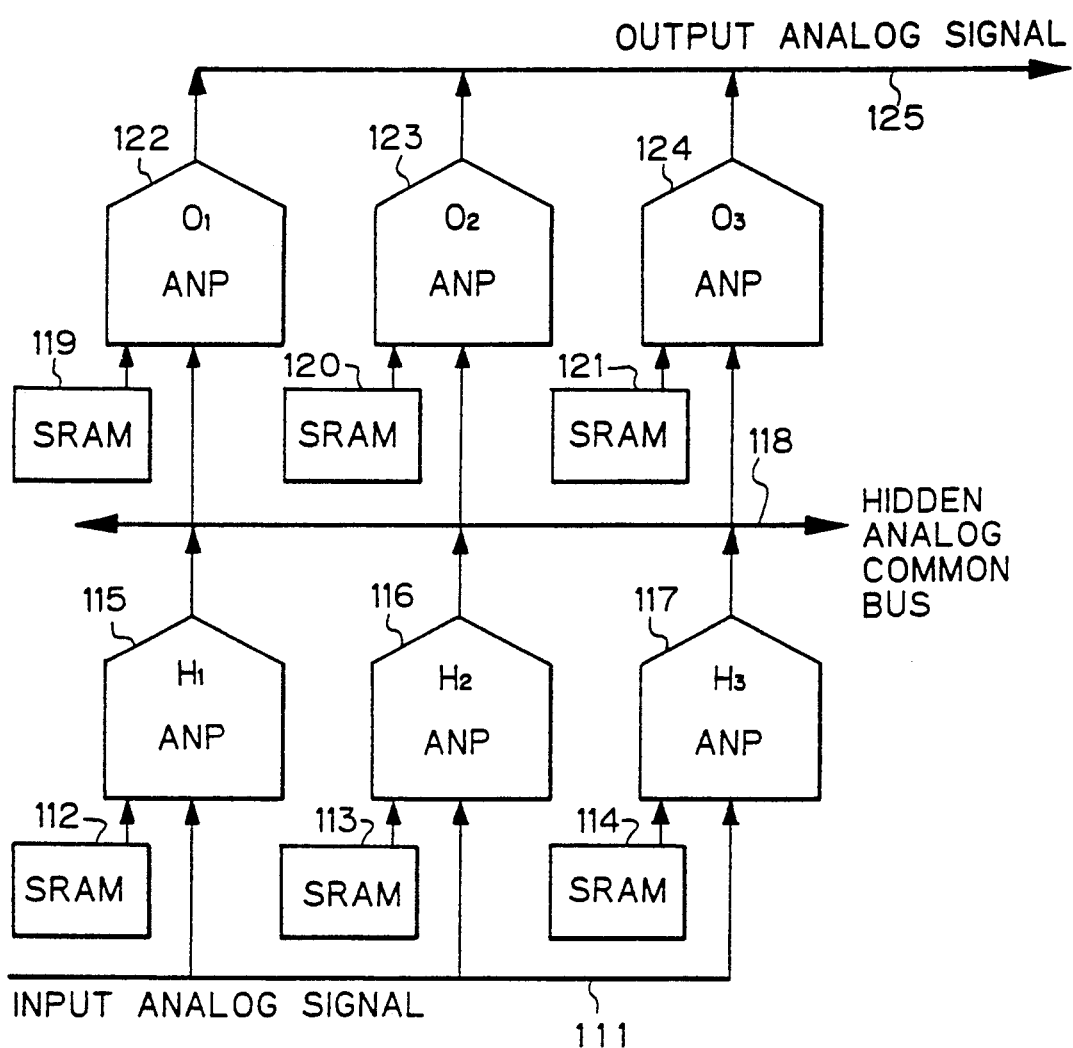
FIG. 5 is a block diagram of an example of three layer unit neural network using the analog neuroprocessors.

FIG. 5 (neural network)

FIG. 5 is a block diagram of an example of a three layer unit neural network using the analog neuroprocessors. In FIG. 5, reference numeral 111 denotes an input bus, 112 to 114, and 119 to 121 each denote a static RAM, 115 to 117 each denote an analog neuroprocessor for a hidden layer unit, 118 denotes an intermediate bus, 122 to 124 each denote an analog neuroprocessor for an output layer unit, and 125 denotes an output layer unit.

In the example of FIG. 5, the static RAMs 112 to 114 and 119 to 121 are respectively provided for the analog neuroprocessors 115 to 117 and 122 to 124, to hold the network weights therein and supply the network weights to the corresponding analog neuroprocessors. The transfer of the outputs from the tapped delay line 21 or 41 to the respective analog neuroprocessors 115 to 117 in the hidden layer through the input bus 111; the transfer of the outputs from the analog neuroprocessors 115 to 117 in the hidden layer to the respective analog neuroprocessors 122 to 124 in the output layer through the intermediate bus 118; and the transfer of the outputs of the analog neuroprocessors 122 to 124 in the output layer, are respectively carried out in a time sharing manner. It is known that a transformation including a non-linear transformation can be realized by a neural network as above. The analog neuroprocessor is commercially available as a semi-conductor chip from Fujitsu Limited.

Otherwise, all the above functions which are realized by the analog neuroprocessors, can be realized by software using a digital signal processor(s). In this case, signals are supplied from the signal sampler unit 10 in a digital form to the tapped delay lines 21 and 41, and the tapped delay lines 21 and 41 are realized by shift registers.

Figure 6:
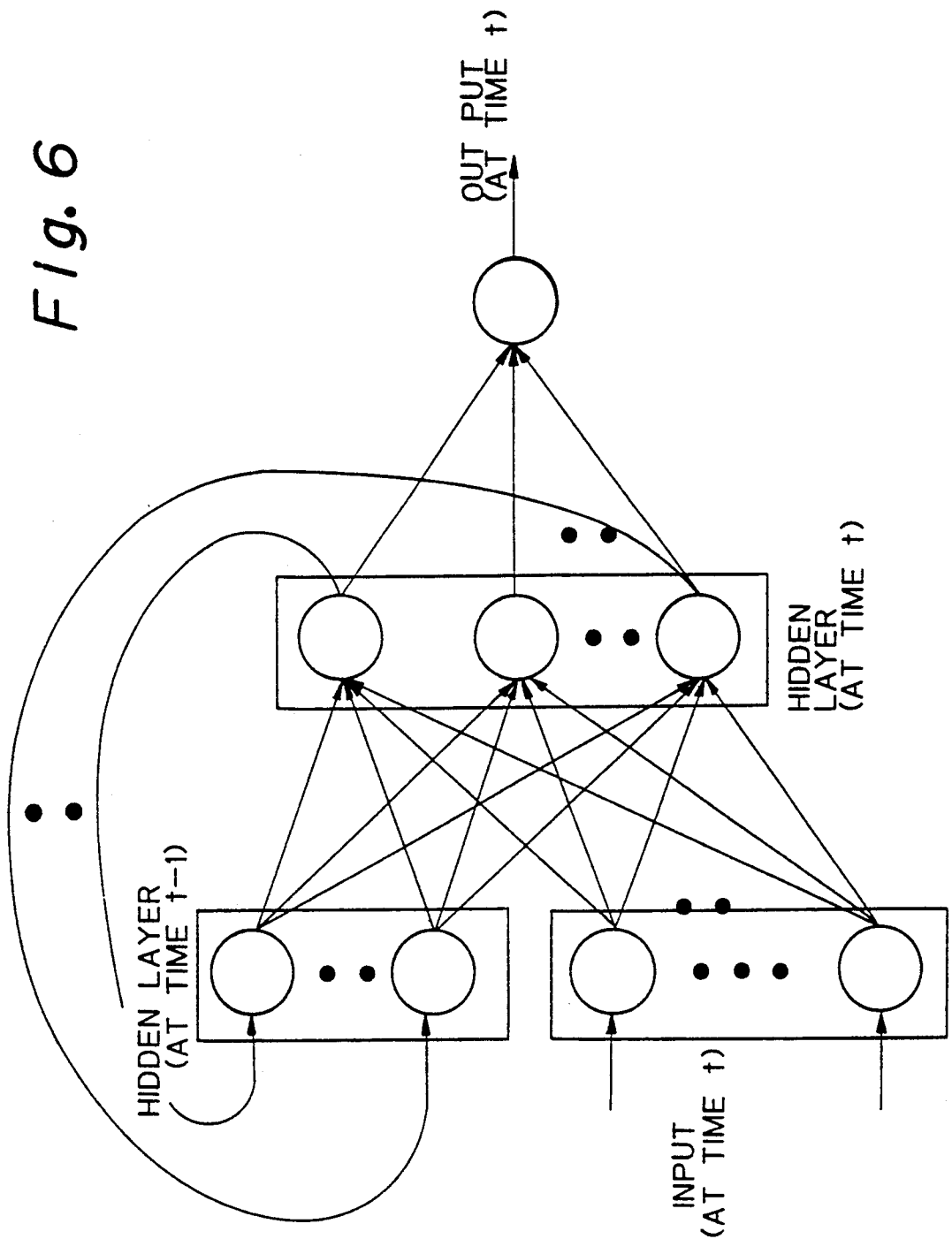
FIG. 6 is a block diagram of an example of recurrent network which may be used instead of the hierarchical network.

Although the hierarchical network is used in the above example, a recurrent network may be used instead of the hierarchical network as shown in FIG. 6 as an example. The recurrent network is disclosed in "Encoding Sequential Structure In Simple Recurrent Networks" by Servan-Schreiber, Axel Cleeremans, and James L. McClelland, CMU Technical Report CMU-CU-88-183, 1988. It is known that recurrent networks may be treated as equivalent to hierarchical networks.

FIG. 2 (equalization)

Returning to FIG. 2, the equalization neural network 22 receives the outputs of the time series generating unit, and equalizes the distorted signal to generate an equalized signal, based on the outputs of the tapped delay line 21 using a set of equalization network weights which are preset therein. That is, the equalizer unit 20 containing the equalization neural network 22 operates as a waveform equalizer for the above-mentioned distorted signal when an optimum set of the equalization network weights are set therein as explained later.

The signal characteristics measuring unit 40 detects distortion characteristics of the distorted signal when an optimum set of the detection network weights are set therein as explained later. As shown in FIG. 2, the detection neural network 42 has three outputs, which respectively output values indicating an amplitude distortion, a delay distortion, and a phase distortion, in this example.

The equalization network weights storage 31 holds a plurality of optimum sets of equalization network weights corresponding to a plurality of possible distortion characteristics, each for being set in the equalization neural network 22, and the equalization network weights selector 32 selects one of the plurality of sets of equalization network weights according to the distortion characteristic (actually, a combination of the amplitude distortion, the delay distortion, and the phase distortion), which is detected in the distortion characteristic measuring unit 40, and supplies the selected set to the equalization neural network 22 to set the selected set therein. The equalization network weights selector 32 comprises a writing control circuit for the SRAMs as shown in FIG. 5 in the equalization neural network 22. When the equalization network weights storage 31 is realized by a RAM, the equalization network weights selector 32 comprises a reading/writing control circuit for the RAM, and the output of the detection neural network 42 is used as an address signal for reading the content of the RAM. The clock extracting unit 80 extracts a clock (timing) signal from the output (equalized) signal of the equalization unit 20. The clock signal is supplied to the equalization network weights selector 32 to provide a timing of the selection.

FIG. 2 (learning of the network weights)

The learning controller 50 obtains an optimum set of the equalization network weights for each distortion characteristic (each combination of values of the amplitude distortion, the delay distortion, and the phase distortion) so that the equalization neural network 22 outputs a best equalized signal for a distorted signal having the distortion characteristic when the optimum set of the equalization network weights is preset in the equalization neural network 22, and supplies the obtained set to the equalization network weights storage 31 so that the equalization network storage 31 stores therein the set of equalization network weights obtained for each of the distortion characteristics (each of the combinations of values of the amplitude distortions, the delay distortions, and the phase distortions). When the equalization network weights storage 31 is a RAM, the above obtained set of the equalization network weights is written in the RAM through the above reading/writing control circuit.

The above functions of the learning controller 50 for obtaining and supplying the optimum set of the equalization network weights through following units is realized by a software program which contains the following units:

a unit for storing a model signal which is not distorted;

a unit for generating a plurality of model distorted signals being respectively generated from the model signal by distorting the model signal according to a plurality of types of distortion characteristics, and supplying the model distorted signals to the equalization neural network;

a unit for setting a set of equalization network weights to the equalization neural network;

a unit for monitoring the output of the equalization neural network;

a unit for modifying the set of equalization network weights which are set by the unit for setting the set of equalization network weights to the equalization neural network unit;

a unit for controlling the unit for setting the set of equalization network weights and the unit for modifying the set of equalization network weights based on successive outputs of the equalization neural network unit so that a waveform which is made by the successive outputs of the equalization neural network unit accords to the waveform of the model signal, to obtain the optimum set of the equalization network weights for each of the plurality of model distorted signals; and a unit for controlling an operation of storing the obtained optimum set of the equalization network weights for each of the plurality of model distorted signals, in the equalization network weights storage 31.

The above operation may be carried out by using a simulated equalization neural network unit instead of the above real equalization neural network 22. The simulated equalization neural network unit (by a software) receives the above model distorted signals to the equalization neural network unit, and simulates the operation of the equalization neural network 22.

Similarly, the learning controller 50 obtains an optimum set of the detection network weights which is common to all distortion characteristics (all combinations of values of the amplitude distortions, the delay distortions, and the phase distortions) so that the detection neural network 42 outputs the distortion characteristics corresponding to the distorted signals when the distorted signals after sampled by the signal sampler 10, are received by the signal characteristics measuring unit 40 when the obtained set is preset to the detection neural network 42; and presets the obtained set to the detection neural network 42.

The above functions of the learning controller 50 for obtaining and supplying the optimum set of the detection network weights is realized by a software program which contains the following units:

a unit for generating a plurality of model distorted signals each having a certain distortion characteristic, and supplying the model distorted signals to the detection neural network 42;

a unit for setting a set of detection network weights to the detection neural network 42;

a unit for monitoring the output of the detection neural network 42;

a unit for modifying the set of detection network weights which are set in the above unit for setting the set of the detection network weights in the detection neural network 42;

a unit for controlling the above unit for setting the detection network weights and the unit for modifying the detection network weights, based on the output of the detection neural network 42 to obtain the optimum set of the detection network weights; and a unit for presetting the obtained optimum set of the detection network weights in the detection neural network 42. The presetting is effected, for example, in the SRAMs as shown in FIG. 5.

Any distortion including non-linear distortion can be detected as distortion values by using the neural network 42.

The above operation may be carried out by using a simulated detection neural network unit instead of the above real detection neural network 42. The simulated detection neural network unit (by software) receives the above model distorted signals which are to be applied to the detection neural network 42, and simulates the operation of the detection neural network 42.

The details of an example of the above operations of the learning controller 50, are explained later.

Figure 7:
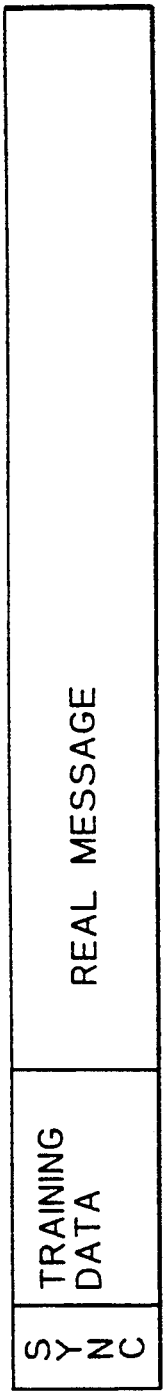
FIGS. 7 and 8 are diagrams showing an example of a frame format of the input signal.
Figure 8:
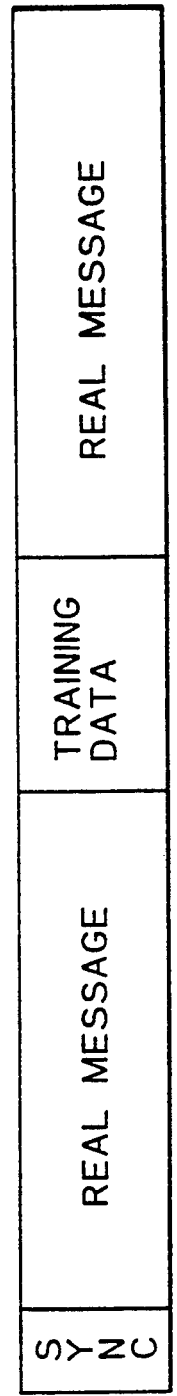

FIGS. 2, 7, and 8 (operation of equalization)

FIGS. 7 and 8 are diagrams showing an example of a frame format of the input signal. In the frame format of FIG. 7, a predetermined training data is included after a synchronization pattern SYNC, and before a real message. On the other hand, in the frame format of FIG. 8, a predetermined training data is inserted intervening the real message. The training data is the same data as the aforementioned model distorted signal which is used for obtaining the optimum set of the detection network weights.

First, it is assumed that the above setting of the optimum set of detection network weights in the detection neural network 42, and the storing of the plurality of optimum sets of equalization network weights are completed. In the case the frame format of FIG. 7 is used, after each frame is received and sampled in the signal sampler unit 10, the sampled training data is supplied through the tapped delay line 41 to the detection neural network 42. Receiving the training data signal, the detection neural network 42 outputs the values of the amplitude distortion, the delay distortion, and the phase distortion from the three output layer units thereof. These outputs are supplied to the equalization network weights selector 32, and then the equalization network weights selector 32 reads from the equalization network weights storage 31 a set of equalization network weights corresponding to the combination of the supplied values of the amplitude distortion, the delay distortion, and the phase distortion, and sets the set of the equalization network weights in the equalization neural network 22. The equalization neural network 22 eliminates the above distortion from its input signal when the set of the equalization network weights corresponding to the distortion characteristics is set thereto. Therefore, when the real message portion of the above frame is supplied through the tapped delay line 21 to the equalization neural network 22, the real message portion of the above frame is equalized. As mentioned before, any distortion including non-linear distortion can be eliminated by using the neural network 22.

In the case where the functions of FIG. 2 are realized by the digital signal processor, each frame of the distorted signal sampled in the sampler unit 10 is once held in a buffer memory (not shown), and then the training data portion in the frame is first read from the buffer memory to be supplied to the detection neural network 42 as explained above, and the distortion characteristic values are determined from the distortion in the training data portion as the outputs of the detection neural network 42. Then, a set of equalization network weights corresponding to the combination of the supplied distortion characteristic values, are set in the equalization neural network 22. After that, the real message portion of the above frame is read out of the buffer memory to be supplied through the tapped delay line 21 to the equalization neural network 22, and the real message portion of the above frame is equalized. Therefore, in the case where the functions of FIG. 2 are realized by the digital signal processor, since the sampled values of each frame are once held in the buffer memory, the training data portion can be first supplied to the signal characteristics measuring unit 40 before the real message portion is supplied to the equalization unit 20 even when the frame format of FIG. 8 is used. As understood by comparing the frame formats of FIGS. 7 and 8, the frame format of FIG. 8 is advantageous because the maximum time difference from the training data portion to the farthest portion of the real message portion in each frame in FIG. 8 is smaller than FIG. 7, and therefore, the maximum difference of the distortion characteristic in the training data portion and the real message portion in FIG. 8 is smaller than FIG. 7.

(2) Second Embodiment

FIG. 9

Figure 9:
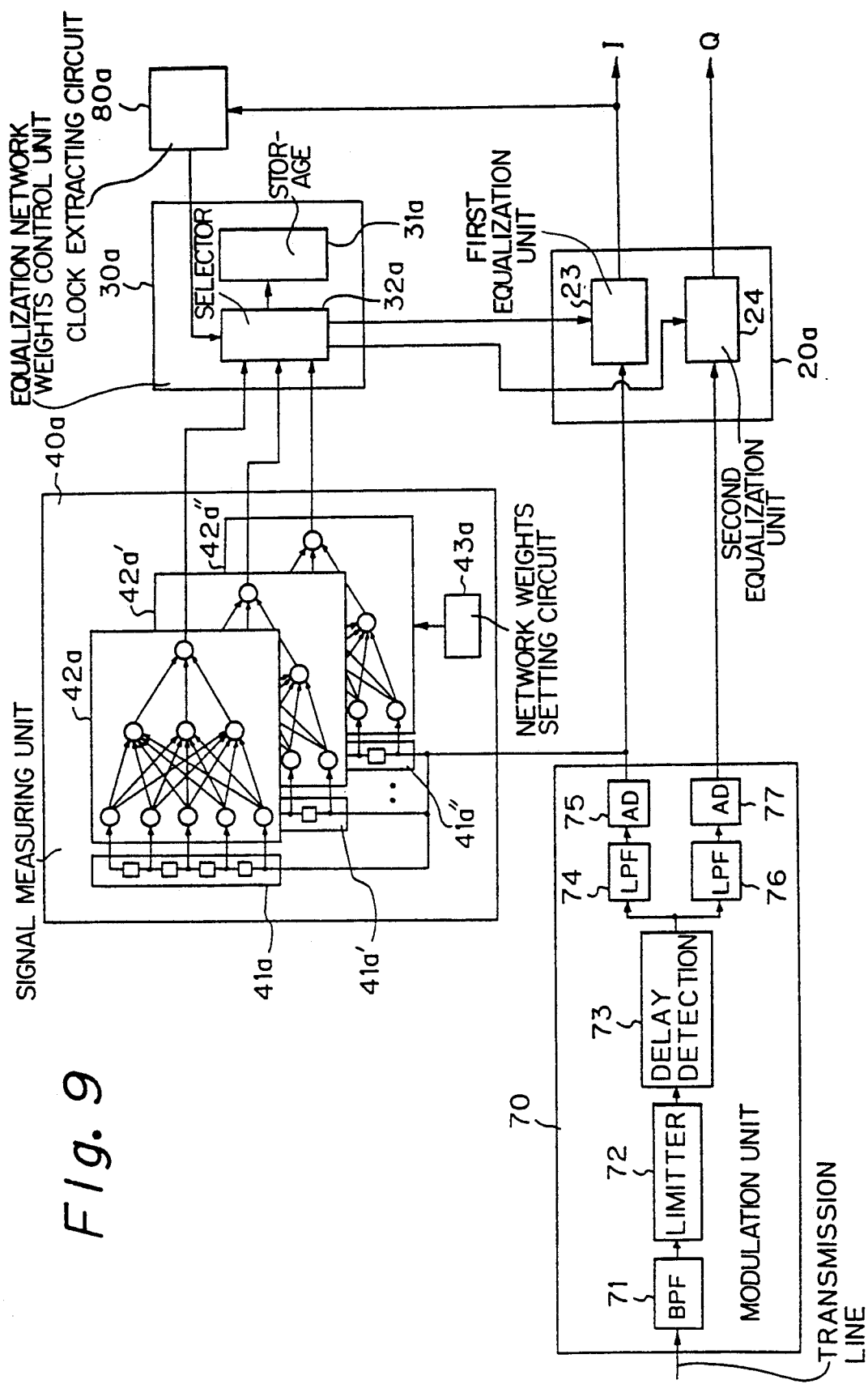
FIG. 9 is a diagram showing the construction of the second embodiment of the present invention.

FIG. 9 is a diagram showing the construction of the second embodiment of the present invention. FIG. 9 shows the construction of the demodulation and equalization apparatus for demodulating and equalizing a received signal which is modulated by the quadrature phase shift keying (QPSK) by delay detection. In the construction of FIG. 9, reference numeral 20a denotes an equalizer unit, 23 and 24 each denote an equalizer, 30a denotes an equalization network weights control unit, 31a denotes an equalization network weights storage, 32a denotes an equalization network weights selector, 40a denotes a signal characteristics measuring unit, 41a, 41a' and 41a'' each denote a tapped delay line, 42a, 42a' and 42a'' each denote a detection neural network, 43 denotes a network weights setting circuit, 70 denotes a demodulator unit, 71 denotes a band pass filter, 72 denotes a limiter, 73 denotes a delay detection circuit, 74 and 76 each denote a low pass filter, 75 and 77 each denote an analog to digital converter, and 80a denotes a clock extracting circuit. The frequency range of the received signal which is modulated by the quadrature phase shift keying (QPSK) is limited to the carrier frequency of the modulated signal by the band pass filter 71. Then, the output signal of the band pass filter 71 is transformed to a rectangular form by the limiter 72, and the I-channel and the Q-channel of the received signal is obtained by the delay detection circuit 73. The I-channel and the Q-channel are then sampled and converted to digital forms in the analog to digital converters 75 and 77 after the higher harmonic components are eliminated by the low pass filters 74 and 76, respectively. The digital sampled signals of the I-channel and the Q-channel are supplied to first and second equalization units 23 and 24, respectively. In addition, the I-channel signal is supplied to the signal characteristics measuring unit 40a.

In the above construction of the modulation unit 70, the existence of the limiter 72 and the delay detection circuit 73 will cause a non-linear distortion in the received signal.

As shown in FIG. 9, the signal characteristics measuring unit 40a comprises a plurality of detection neural network units 42a, 42a' and 42a'' which respectively receive the outputs of the tapped delay lines 41a, 41a' and 41a'' in the distortion characteristic detecting unit 40a, and generate a value indicating one of the distortion characteristics of the distorted signal based on the outputs of the corresponding one of the tapped delay lines 41a, 41a' and 41a'' using a set of detection network weights which are preset therein. The set of the detection network weights are determined and preset in a similar way to the first embodiment, although the learning controller 50 is not shown in FIG. 9. For example, each of the plurality of detection neural network units 42a, 42a' and 42a'' outputs one of the above distortion characteristics, the amplitude distortion, the delay distortion, and the phase distortion. Further, instead of providing the plurality of tapped delay lines 41a, 41a' and 41a'' for the plurality of detection neural network units 42a, 42a' and 42a'', only one tapped delay line may be provided commonly to the plurality of detection neural network units 42a, 42a' and 42a''.

The equalization network weights storage 31a stores all the optimum sets of the equalization network weights which are to be set in the first and second equalization units 23 and 24, where the optimum sets are determined by the learning controller 50, and are stored by the equalization network weights storage 32a as in the first embodiment.

The equalization network weights selector 32a receives the above outputs of the plurality of detection neural network units 42a, 42a' and 42a'', and reads and sets one of the plurality of sets of the equalization network weights in the first and second equalization units 23 and 24. Therefore, the above I-channel and the Q-channel signals are respectively equalized through the first and second equalization units 23 and 24. The clock extracting unit 80a extracts a timing signal (clock) from the equalized I-channel signal to supply a timing of its operation.

Further, the function of the delay detection in the demodulation unit 70 may be included in the equalization unit 20a. That is, the first and second equalization units 23 and 24 each can operate as a demodulator at the same time as an equalizer.

(3) Third Embodiment

Figure 10:
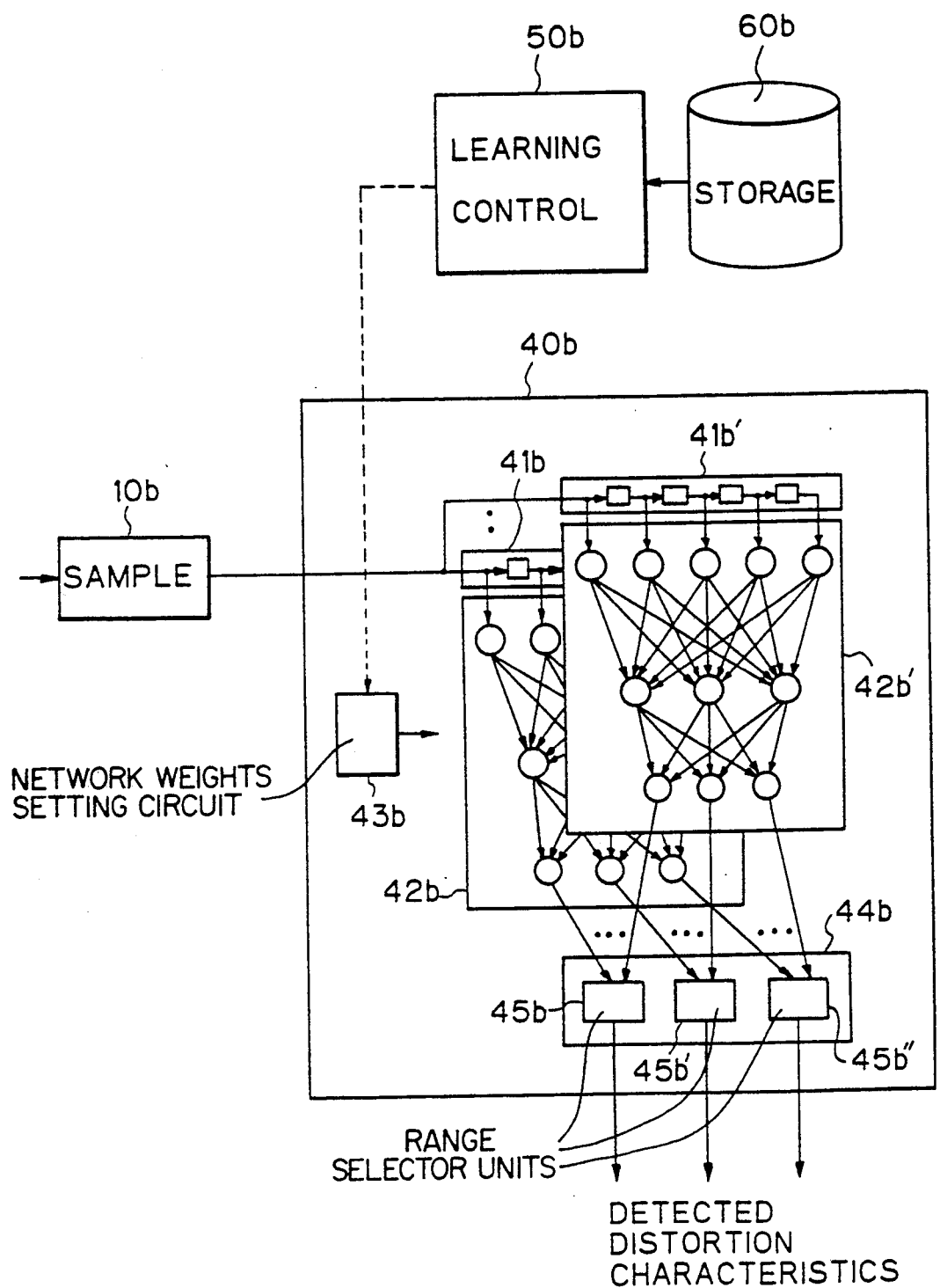
FIG. 10 is a diagram showing the construction of the third embodiment of the present invention.
Figure 11:
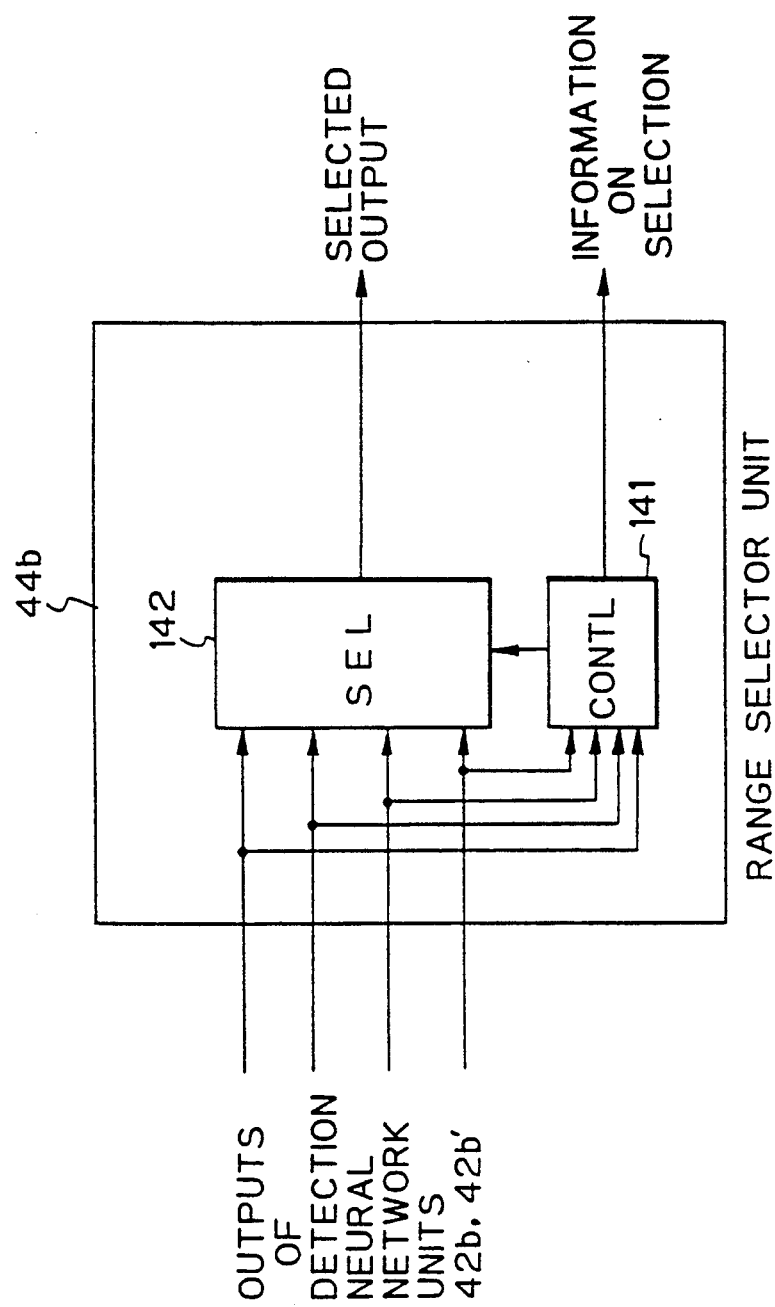
FIG. 11 is a diagram showing the construction of the range selector unit in the construction of FIG. 10.

FIGS. 10 and 11

FIG. 10 is a diagram showing the construction of the third embodiment of the present invention. FIG. 10 shows the construction of the signal characteristics measuring unit 40b in the third embodiment of the present invention. In the construction of FIG. 10, reference numeral 10b denotes a signal sampler unit, 40b denotes a signal characteristics measuring unit, 41b and 41b' each denote a tapped delay line, 42b and 42b' each denote a detection neural network, 43b denotes a network weights setting circuit, and 44b denotes a zone selector unit, and 45b and 45b' each denote a range selector unit.

As shown in FIG. 10, the signal characteristics measuring unit 40b comprises a plurality of detection neural networks 42b and 42b'. Each of the plurality of detection neural networks 42b and 42b' receives the outputs of the tapped delay lines 41b and 41b' in the distortion characteristic detecting unit 40b, generates and outputs values respectively indicating the distortion characteristics (the amplitude distortion, the delay distortion, and the phase distortion) of the distorted signal, when each of the amounts of the distortion characteristics which are contained in the distorted signal, is within a part, which is assigned to the detection neural network, of the whole range of the distortion characteristic to be detected, and generates and outputs a predetermined value (for example, the maximum value of the output range of the detection neural network units 42b and 42b') when an amount of the detection characteristic which is contained in the distorted signal, is out of the part assigned to the detection neural network, based on the outputs of the tapped delay line in the signal characteristics measuring unit 40b using a set of detection network weights which are preset therein. The set of the detection network weights are determined and preset in a similar way to the first embodiment, although the learning controller 50 is not shown in FIG. 10. For example, each of the plurality of detection neural network units 42b and 42b' outputs a value indicating one of the above distortion characteristics, the amplitude distortion, the delay distortion, and the phase distortion. Further, instead of providing the plurality of tapped delay lines 41b and 41b' for the plurality of detection neural network units 42b and 42b', only one tapped delay line may be provided commonly to the plurality of detection neural network units 42b and 42b'.

The plurality of range selector units 45b and 45b' are each provided for one of the distortion characteristics (for example, the amplitude distortion) which are detected by the signal characteristics measuring unit 40b. Each of the plurality of range selector units 45b and 45b' receives the outputs of the plurality of detection neural network units 42b and 42b' regarding one of the of distortion characteristics, and selects the output of one of the plurality of detection neural network units 42b and 42b'. FIG. 11 is a diagram showing the construction of each of the plurality of range selector units 45b and 45b'. As shown in FIG. 11, each range selector unit comprise a selector 142 and a selector controller 141.

The selector controller 141 in each range selector unit receives the outputs of the plurality of detection neural network units 42b and 42b' regarding the corresponding one of the distortion characteristics, and the controls the corresponding selector 142 based on the received outputs of the plurality of detection neural network units 42b and 42b', so that the corresponding selector selects the output of one of the detection neural network units 42b and 42b' which does not output the predetermined value, and outputs the above predetermined value (for example, the maximum value of the output range of the detection neural network units 42b and 42b') when all of the outputs of the detection neural network units 42b and 42b' regarding the corresponding one of the distortion characteristics are equal to the predetermined value (the maximum value).

The above selector controller 141 sends information on the above selection to the equalization network weights storage 32b in the equalization network weights control unit 30b. Receiving the information together with the output of the selector 141, the equalization network weights storage 32b can recognize the real amount of the distortion characteristic, and select and read the corresponding optimum set of the network weights.

According to the above construction of FIGS. 10 and 11, the whole output range of each detection neural network is used for indicating only a part of the total range of the value of a distortion characteristic, the precision of the distortion characteristics is improved.

(4) Fourth Embodiment

Figure 12:
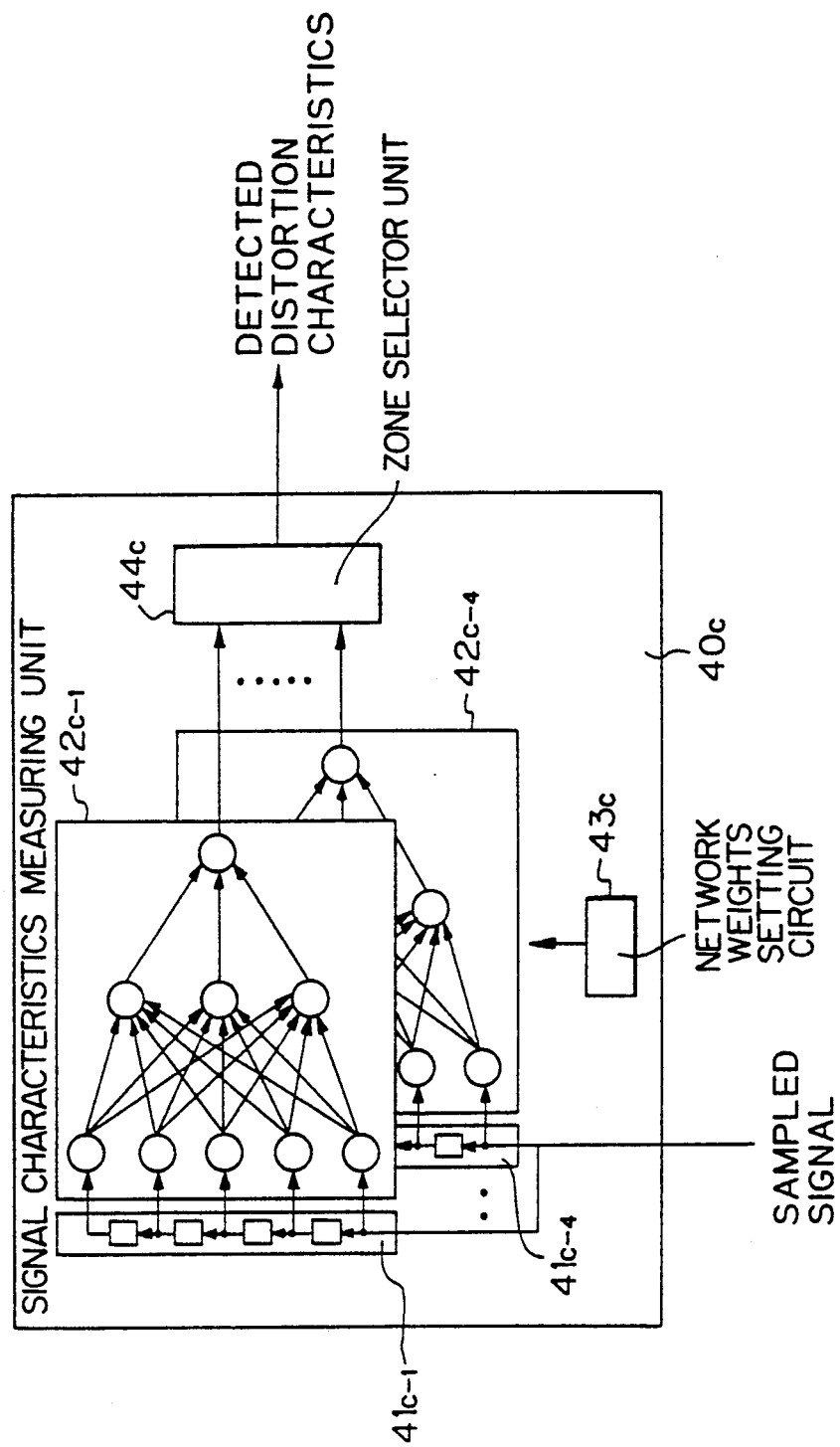
FIG. 12 is a diagram showing the construction of the fourth embodiment of the present invention.

FIGS 11 and 12

FIG. 12 is a diagram showing the construction of the fourth embodiment of the present invention. FIG. 12 shows the construction of the signal characteristics measuring unit 40c in the fourth embodiment of the present invention. In the construction of FIG. 12, reference numeral 40c denotes a signal characteristics measuring unit, 41c-1 to 41c-4 each denote a tapped delay line, 42c-1 to 42c-4 each denote a detection neural network, 43c denotes a network weights setting circuit, and 44c denotes a zone selector unit. In FIG. 12, for simplicity of the explanation, it is assumed that the signal characteristics measuring unit 40c detects only two distortion characteristics, the amplitude distortion and the delay distortion.

As shown in FIG. 12, the signal characteristics measuring unit 40c comprises a plurality of detection neural networks 42c-1 to 42c-4. Each of the plurality of detection neural networks 42c-1 to 42c-4 receives the outputs of the tapped delay lines 41c-1 to 41c-4 in the distortion characteristic detecting unit 40c, generates and outputs a value respectively indicating a distortion characteristic (the amplitude distortion, the delay distortion, and the phase distortion) of the distorted signal, when an amount of the distortion characteristic which is contained in the distorted signal, is within a part, which is assigned to the detection neural network, of the whole range of the distortion characteristic to be detected, and generates and outputs a predetermined value (for example, the maximum value of the output range of the detection neural network units 42c-1 to 42c-4) when the amount of the distortion characteristic is out of the part assigned to the detection neural network, based on the outputs of the tapped delay line in the signal characteristics measuring unit 40c using a set of detection network weights which are preset therein.

For example, the detection neural network 42c-1 outputs a value indicating the amplitude distortion when the amplitude distortion to be detected is not more than the center value of the total range of the amplitude distortion to be detected, and outputs the maximum value of the output range of the detection neural network 42c-1 when the amount of the amplitude distortion which is contained in the distorted signal, is more than the center value of the total range of the amplitude distortion to be detected. The detection neural network 42c-2 outputs the value indicating the amplitude distortion when the amount of the amplitude distortion which is contained in the distorted signal, is not less than the center value of the total range of the amplitude distortion to be detected, and outputs the maximum value of the output range of the detection neural network 42c-2 when the amount of the amplitude distortion is less than the center value of the total range of the amplitude distortion to be detected. The detection neural network 42c-3 outputs the value indicating the delay distortion when the amount of the delay distortion is not more than the center value of the total range of the delay distortion to be detected, and outputs the maximum value of the output range of the detection neural network 42c-3 when the amount of the delay distortion is more than the center value of the total range of the delay distortion to be detected. The detection neural network 42c-4 outputs the value indicating the delay distortion when the amount of the delay distortion is not less than the center value of the total range of the delay distortion to be detected, and outputs the maximum value of the output range of the detection neural network 42c-4 when the amount of the delay distortion is less than the center value of the total range of the delay distortion to be detected. Therefore, each of the above values respectively indicating the amplitude distortion and the delay distortion can be output in the output range substantially twice the output range as the total ranges of the amplitude distortion or the delay distortion is output from one detection neural network.

The zone selector unit 45c has the same construction as the above-mentioned third embodiment except that only two distortion characteristics are shown in the fourth embodiment.

TABLE 1

Range Assignment for Amplitude Distortion and Delay Distortion

| Amplitude Ratio | Delay | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| 0.1 | A | A | A | A | A | C | C | C | C | C |
| 0.2 | A | A | A | A | A | C | C | C | C | C |
| 0.3 | A | A | A | A | A | C | C | C | C | C |
| 0.4 | A | A | A | A | A | C | C | C | C | C |
| 0.5 | A | A | A | A | A | C | C | C | C | C |
| 0.6 | B | B | B | B | B | D | D | D | D | D |
| 0.7 | B | B | B | B | B | D | D | D | D | D |
| 0.8 | B | B | B | B | B | D | D | D | D | D |
| 0.9 | B | B | B | B | B | D | D | D | D | D |
| 1.0 | B | B | B | B | B | D | D | D | D | D |

TABLE 2

Example of Output Values Indicating Delay Distortions in a Detection Neural Network Unit

| Amplitude Ratio | Delay | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| 0.1 | 0.2 | 0.4 | 0.6 | 0.8 | 1.0 | 1.0 | 1.0 | 1.0 | 1.0 | 1.0 |
| 0.2 | 0.2 | 0.4 | 0.6 | 0.8 | 1.0 | 1.0 | 1.0 | 1.0 | 1.0 | 1.0 |
| 0.3 | 0.2 | 0.4 | 0.6 | 0.8 | 1.0 | 1.0 | 1.0 | 1.0 | 1.0 | 1.0 |
| 0.4 | 0.2 | 0.4 | 0.6 | 0.8 | 1.0 | 1.0 | 1.0 | 1.0 | 1.0 | 1.0 |
| 0.5 | 0.2 | 0.4 | 0.6 | 0.8 | 1.0 | 1.0 | 1.0 | 1.0 | 1.0 | 1.0 |
| 0.6 | 1.0 | 1.0 | 1.0 | 1.0 | 1.0 | 1.0 | 1.0 | 1.0 | 1.0 | 1.0 |
| 0.7 | 1.0 | 1.0 | 1.0 | 1.0 | 1.0 | 1.0 | 1.0 | 1.0 | 1.0 | 1.0 |
| 0.8 | 1.0 | 1.0 | 1.0 | 1.0 | 1.0 | 1.0 | 1.0 | 1.0 | 1.0 | 1.0 |
| 0.9 | 1.0 | 1.0 | 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 | 1.0 | 1.0 | 1.0 |

Table 1 shows the range assignment for the amplitude distortion and the delay distortion, where the range 0 to 1.0 is assigned to each of the detection neural network units 42c-1 to 42c-4. In Table 1, A, B, C, and D each denote a zone which is determined by a combination of the ranges of the amplitude distortion and the delay distortion. Further, as shown in Table 2, in each zone, each of the above values respectively indicating the amplitude distortion and the delay distortion can be output in the output range substantially twice the output range as the total ranges of the amplitude distortion or the delay distortion is output from one detection neural network.

The set of the detection network weights are determined and preset in a similar way to the first embodiment, although the learning controller 50 is not shown in FIG. 12. Further, instead of providing the plurality of tapped delay lines 41c-1 to 41c-4 for the plurality of detection neural network units 42c-1 to 42c-4, only one tapped delay line may be provided commonly to the plurality of detection neural network units 42c-1 to 42c-4.

According to the above construction of FIGS. 10 and 11, the whole output range of each detection neural network is used for indicating only a part of the total range of the value of a distortion characteristic, so the precision of the distortion characteristics is improved.

(5) Preparation of Model Distorted Signal

Before the operation of the learning controller 50 for obtaining the optimum set of the network weights, the aforementioned model distorted signals are obtained as explained below.

The aforementioned model distorted signals each having a certain distortion characteristic, are generated based on a two-wave interference model of a signal on a transmission line. According to the two-wave interference model, a signal which is received at the receiver is approximated by a superimposition of a direct non-distorted wave and a reflected wave which contains distortion such as an amplitude distortion, a delay distortion, and a phase distortion. For example, when the transmitted signal is modulated by the quadrature phase shift keying (QPSK), a modulated signal, i.e., I(t-)coswct+Q(t)sinwct is transmitted from a sender side, the reflected wave in the I-channel is expressed as $$A \cdot (I(t-\tau) \cos \omega_c (t-\phi) + Q(t-\tau) \sin \omega_c (t-\phi)),$$

where A denotes the amplitude distortion, $\tau$ denotes the delay distortion which is normalized as $0 \leq \tau \leq 1$, and $\phi$ denotes the phase distortion which is normalized as $0 \leq \phi \leq 1$.

Based on the above model, it is supposed that a predetermined successive data pattern, for example, "010" is received on the I-channel, waveforms of demodulated signals (corresponding to the input of the equalization unit 20 of FIG. 2) corresponding to the reception of the pattern "010" which contain distortion corresponding to various values for the amplitude distortion A, the delay distortion $\tau$, and the phase distortion $\phi$, are generated by computer simulations, and the waveforms of the portion "10" in the above pattern "010" is extracted for use as learning signals (the model distorted signals). The first bit "0" is provided only for stabilizing the waveforms corresponding to the following bits "10", and therefore, is discarded after the above simulation. The above pattern "10" with the preceding bit "0" is predetermined to be the same as the aforementioned training data, i.e., the training data also contains the pattern "010".

Figure 14:
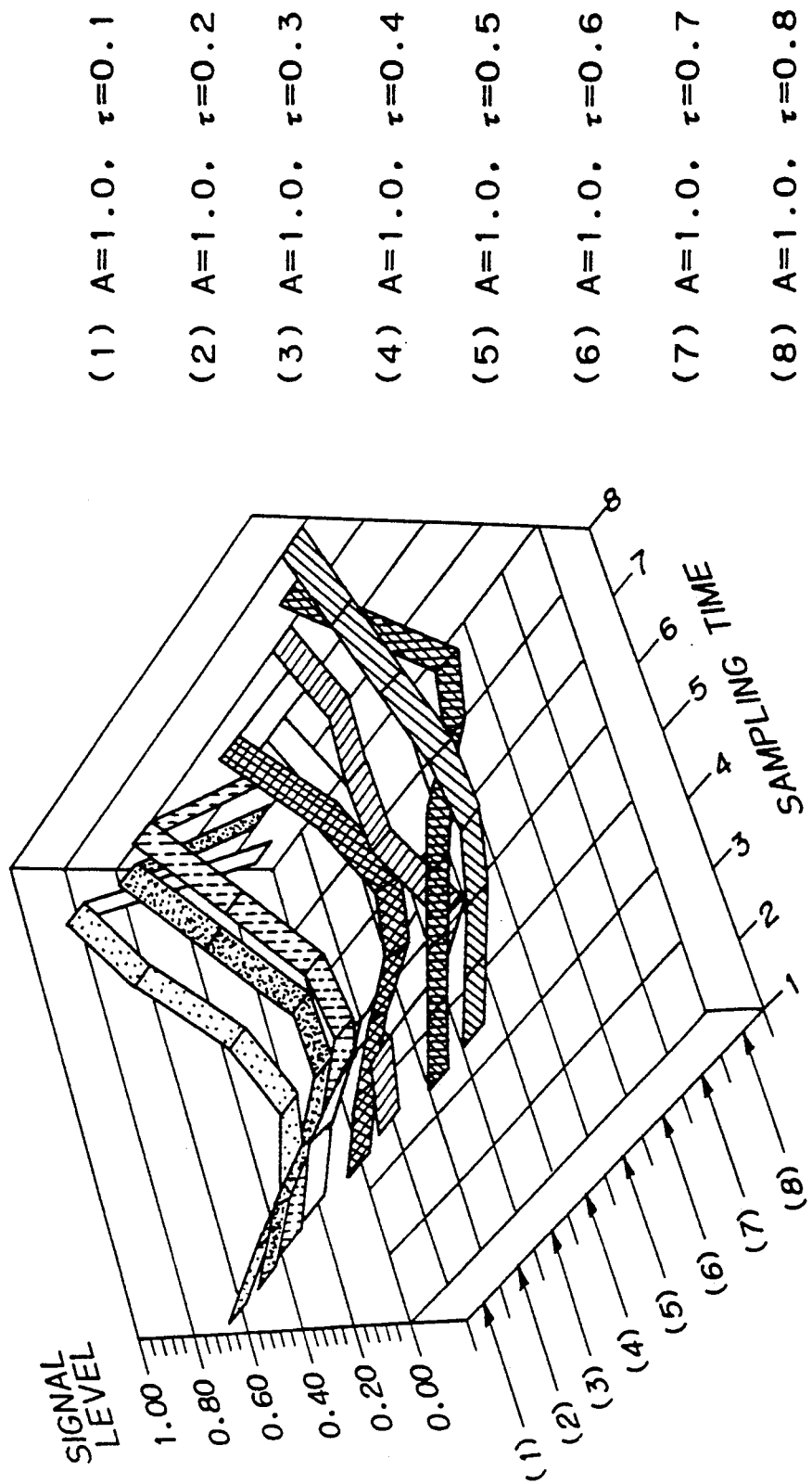

FIG. 13 is a diagram showing waveforms of the non-distorted signal corresponding to the pattern "10" and an example of a model distorted signal corresponding to the non-distorted signal, and FIGS. 14 and 15 are each a diagram showing the waveforms of the distorted signals which are obtained as above for the data pattern "10" and the various combinations of values of the amplitude distortions A and the delay distortions $\tau$. In FIG. 14, the value of the amplitude distortion A is fixed to A=0, and the values of the delay distortion $\tau$ is varied from 0.1 to 0.8. In FIG. 15, the value of the amplitude distortion A is varied from 0.1 to 0.9, and the value of the delay distortion $\tau$ is fixed to 0.8. It is assumed that the signal levels are inverted through the demodulation in the simulations. In the examples of FIGS. 13 and 14, seven samples of signal levels are shown for each simulation case, where the sampling rate is four times the Baud rate of the signal.

The waveform data and the corresponding combinations of the distortion characteristic values are stored in the learning data storage unit 60 (FIG. 2). Thus, the model simulated signals have been prepared.

(6) Obtaining of Optimum Set of Weights

The details of an example of the functions of the learning controller 50 for obtaining the optimum set of the network weights are explained below. For the example, the aforementioned back propagation method is explained. The explanation is made based on the construction of the hierarchical network shown in FIG. 3.

In FIG. 3, $y_{ph}$ (p, h=1, 2, ...) denotes an input signal to the hierarchical network, and $y_{pj}$ (p, j=1, 2, ...) denotes an output signal of the hierarchical network, where the index p is used for indicating different input signals (corresponding to different model distorted signals containing different distortion characteristics), h is used for different input layer units, i is used for different hidden layer units, and j is used for indicating generally different output layer units (although only one output layer unit is shown in FIG. 3). When a target value (the above-mentioned model non-distorted signal, or an amount of a distortion characteristic, for example, an amount of the amplitude distortion A) of the output signal $y_{pj}$ is denoted by $d_{pj}$ (p, j=1, 2, ...), a difference $y_{pj}-d_{pj}$ between the output signal $y_{pj}$ and the target value $d_{pj}$ is calculated, and then, a value $\alpha_{pj}=y_{pj}\cdot(1-y_{pj})\cdot(d_{pj}-y_{pj})$ is calculated. Next, a correction of the network weight between the hidden layer and the output layer is calculated as $$\Delta W_{ji}(t) = \epsilon \cdot \sum_p \alpha_{pj} \cdot Y_{pi} + \zeta \cdot \Delta W_{ji}(t-1),$$

where $\epsilon$ and $\zeta$ each denote a constant, and t denotes a number of learning cycles. In addition, a value $\beta_{pi}=y_{pi}\cdot(1-y_{pi})\cdot\Sigma\alpha_{pj}\cdot W_{ji}(t-1)$ is calculated. Next, a correction of the network weight between the input layer and the hidden layer is calculated as $$\Delta W_{ih}(t) = \epsilon \cdot \sum_p \beta_{pi} \cdot y_{ph} + \zeta \cdot \Delta W_{ih}(t-1).$$

Thus, using the above correction values $\Delta W_{ji}(t)$ and $\Delta W_{ih}(t)$, the network weight values are repeatedly modified as $$W_{ji}(t) = W_{ji}(t-1) + \Delta W_{ji}(t), \text{ and}$$

$$W_{ih}(t) = W_{ih}(t-1) + \Delta W_{ih}(t),$$

to obtain an optimum set of the network weights $W_{ji}$ and $W_{ih}$ which leads to the above target (the aforementioned optimum) values. The above operation back propagation method can be used for obtaining both the equalization network weights and the detection network weights.

In the case of obtaining the detection network weights, the learning controller 50 presets the above-obtained optimum network weights in the detection neural network. When the neural network is realized by software using a digital signal processor, the obtained network weights are stored in a predetermined region of a RAM which is used by the digital signal processor. In the case of obtaining the equalization network weights, the learning controller 50 obtains the optimum set of the equalization network weights for each of the plurality of model distorted signals, and stores the obtained set in the equalization network weights storage 32 for each distortion characteristic corresponding to the model distorted signal.

In operation, when a distorted training signal corresponding to the same pattern as the model simulated signal is input, the signal characteristics measuring units 40, 40a, and 40b (in FIG. 2, 9, and 10) in which the optimum sets of the network weights are preset, respectively output the values of the distortion characteristics which the distorted training signal contain, as explained before.

TABLE 3

| | | | | | |
|---|---|---|---|---|---|
| Results of Simulations on Accuracy of Detected Delay Distortions | | | | | |
| | Total Number of | Error ≦ 0.05% Satisfied Samples | | Error ≦ 0.1% Satisfied Samples | |
| Simulation Condition | Samples | (Number) | (Rate, %) | (Number) | (Rate, %) |
| Model Distorted Signals Are Input ($\tau$ = 0.4–0.8) (A = 0.4–1.0) | 210 | 200 | 95.24 | 210 | 100.00 |
| Model Distorted Signals ($\tau$ = 0.2, 0.4–0.8) (A = 0.2, 0.4–1.0) | 288 | 234 | 81.25 | 269 | 93.40 |
| Unknown Distorted Signals ($\tau$ = 0.4–0.8) (A = 0.4–1.0) | 105 | 102 | 97.14 | 105 | 100.00 |
| Unknown Distorted Signals ($\tau$ = 0.2, 0.4–0.8) (A = 0.2, 0.4–1.0) | 144 | 126 | 87.50 | 141 | 97.92 |

TABLE 4

Results of Simulations on Accuracy of Amplitude Distortions

| Simulation Condition | Total Number of Samples | Error ≦ 0.05% Satisfied Samples | | Error ≦ 0.1% Satisfied Samples | |
|---|---|---|---|---|---|
| | | (Number) | (Rate, %) | (Number) | (Rate, %) |
| Model Distorted Signals Are Input ($\tau$ = 0.4–0.8) (A = 0.4–1.0) | 210 | 184 | 87.62 | 205 | 97.62 |
| Model Distorted Signals ($\tau$ = 0.2, 0.4–0.8) (A = 0.2, 0.4–1.0) | 288 | 228 | 79.17 | 274 | 95.14 |
| Unknown Distorted Signals ($\tau$ = 0.4–0.8) (A = 0.4–1.0) | 105 | 99 | 94.29 | 104 | 99.05 |
| Unknown Distorted Signals ($\tau$ = 0.2, 0.4–0.8) (A = 0.2, 0.4–1.0) | 144 | 117 | 81.25 | 140 | 97.22 |

(7) Evaluation by Simulation

Tables 3 and 4 show results of simulations which have been carried out for verifying the credibility of the signal characteristics measuring unit 40c in FIG. 11. In Tables 3 and 4, the simulations are carried out for smaller and larger ranges of the amplitude distortion and the delay distortion. For the smaller range, thirty-five basic model distorted signals are prepared for seven points of the amplitude distortion between A=0.4 to 1.0, and five points of the delay distortion between 0.4 to 0.8, and six types of bit patterns before and after the model pattern "010" are assumed for the input signal, and therefore, 6×35=210 types of the model distorted signals are generated as input signals to obtain the optimum set of the network weights to be set to the detection neural network 42c. For the larger range, forty-eight basic model distorted signals are prepared for eight points of the amplitude distortion between A=0.2 to 1.0, and six points of the delay distortion between 0.2 to 0.8, and six types of bit patterns before and after the model pattern "010" are assumed for the input signal, and therefore, 6×48=288 types of the model distorted signals are generated as input signals to obtain the optimum set of the network weights to be set in the detection neural network 42c.

In the case of the smaller ranges, then, the above 210 types of the model distorted signals are input into the signal characteristics measuring unit 40c, and it is determined whether or not the desired distortion characteristic values are output from the signal characteristics measuring unit 40c within the error of 0.05%, and within the error of 0.1%. Further, three types of bit patterns before and after the model pattern "010", other than the above 210 types are assumed, and therefore, 3×35=105 types of the model distorted signals are generated as input signals to the signal characteristics measuring unit 40c.

In the case of the above larger ranges, then, the above 288 types of the model distorted signals are input into the signal characteristics measuring unit 40c, and it is determined whether or not the desired distortion characteristic values are output from the signal characteristics measuring unit 40c within the error of 0.05%, and within the error of 0.1%. Further, three types of bit patterns before and after the model pattern "010", other than the above 210 types are assumed, and therefore, 3×48=144 types of the model distorted signals are generated as input signals to the signal characteristics measuring unit 40c.

Table 3 shows the possibility of the outputs for the delay distortion t with an error not more than 0.05%, and Table 4 shows the possibility of the outputs for the amplitude distortion A with an error not more than 0.05%. In Tables 3 and 4, the above case where the input signals are respectively the above 210 model distorted signals; the above case where the input signals are respectively the above 288 model distorted signals; the case where the input signals are the 105 signals other than the 210 model distorted signals; and the case where the input signals are the 144 signals other than the 288 model distorted signals are shown.

FIG. 16

Figure 16A:
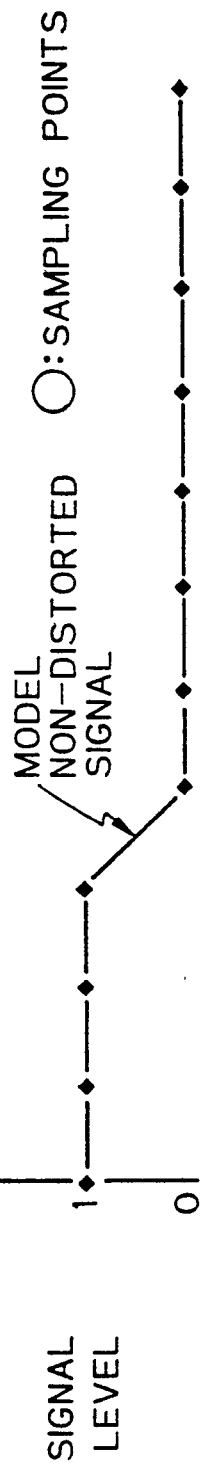
FIG. 16 is a diagram showing waveforms of the non-distorted signal corresponding to the pattern "10", an example of a model distorted signal corresponding to the non-distorted signal, and an equalized signal of the model distorted signal by simulation.
Figure 16B:
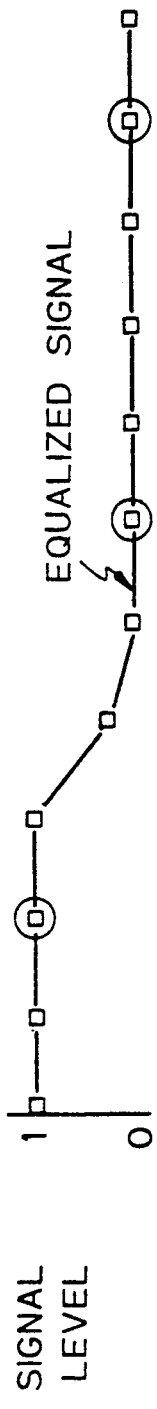
Figure 16C:
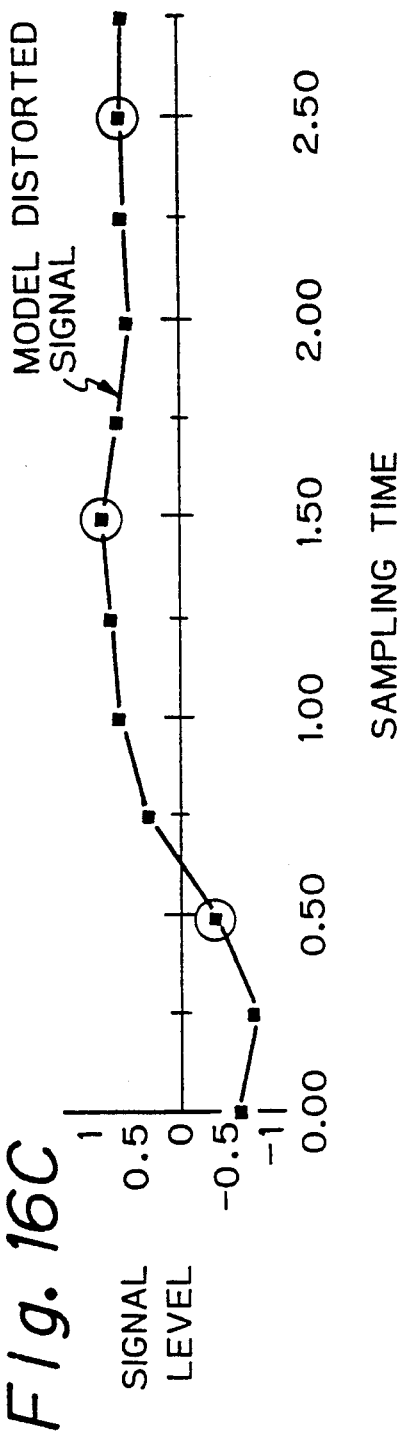

FIG. 16 is a diagram showing waveforms of the non-distorted signal corresponding to the pattern "10", an example of a model distorted signal corresponding to the non-distorted signal, and an equalized signal of the model distorted signal by simulation, where the amplitude distortion A is set to 0.1, and the delay distortion t is set to 0.1.

TABLE 5

Results (Error Rates) of Simulations with Equalization Unit

| Delay Distortion $\tau$ | Amplitude Distortion A | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| 0.1 | 0.00 | 0.00 | 0.00 | 0.00 | 0.00 | 0.00 | 3.72 | 0.00 | 0.00 | 0.00 |
| 0.2 | 0.00 | 0.00 | 0.00 | 0.00 | 0.00 | 0.00 | 0.00 | 0.00 | 0.00 | 0.00 |
| 0.3 | 0.00 | 0.00 | 0.00 | 0.00 | 0.00 | 0.00 | 0.00 | 0.00 | 0.00 | 0.00 |
| 0.4 | 0.00 | 0.00 | 0.00 | 0.00 | 0.00 | 0.00 | 0.00 | 1.06 | 2.66 | 0.53 |
| 0.5 | 0.00 | 0.00 | 0.00 | 0.00 | 0.00 | 0.00 | 0.00 | 0.00 | 0.00 | 0.00 |
| 0.6 | 0.00 | 0.00 | 0.00 | 0.00 | 0.00 | 0.00 | 3.19 | 10.64 | 15.96 | 15.96 |
| 0.7 | 0.00 | 0.00 | 0.00 | 0.00 | 0.00 | 0.00 | 0.00 | 2.13 | 2.66 | 5.32 |

TABLE 5-continued

| Results (Error Rates) of Simulations with Equalization Unit | | | | | | | | | | |
|---|---|---|---|---|---|---|---|---|---|---|
| Delay | Amplitude Distortion A | | | | | | | | | |
| Distortion τ | 0.1 | 0.2 | 0.3 | 0.4 | 0.5 | 0.6 | 0.7 | 0.8 | 0.9 | 1.0 |
| 0.8 | 0.00 | 0.00 | 0.00 | 0.00 | 1.06 | 4.26 | 6.38 | 6.38 | 9.04 | 5.32 |

Table 5 shows results (error rates) of simulations which have been carried out for verifying the credibility of the equalization unit 23 in FIG. 9. In the above simulations, the optimum set of the network weights is obtained by supplying eighty model distorted signals for ten points of the amplitude distortion between A=0.1 to 1.0, and eight points of the delay distortion between 0.1 to 0.8. Then, distorted signals corresponding to the pattern "10" and different from the above model distorted signals are input into the equalization unit 23, and corresponding outputs are compared with the non-distorted signal. The simulations are carried out without the signal characteristics measuring unit 40a and the equalization network weights control unit 30a. That is, the optimum sets of the network weights are correctly set in the equalization unit 23 in the simulations. The output signals are sampled at the sampling points shown in FIG. 16 by circles, are digitized by discriminating the signals using a threshold level of 0.5, and are respectively compared with the non-distorted signal.

TABLE 6

| Results (Error Rates) of Simulations without Equalization Unit | | | | | | | | | | |
|---|---|---|---|---|---|---|---|---|---|---|
| Delay | Amplitude Distortion A | | | | | | | | | |
| Distortion τ | 0.1 | 0.2 | 0.3 | 0.4 | 0.5 | 0.6 | 0.7 | 0.8 | 0.9 | 1.0 |
| 0.1 | 0.00 | 0.00 | 0.00 | 0.00 | 0.00 | 0.00 | 0.00 | 0.00 | 0.00 | 0.00 |
| 0.2 | 0.00 | 0.00 | 0.00 | 0.00 | 0.00 | 0.00 | 0.00 | 0.00 | 0.00 | 0.00 |
| 0.3 | 0.00 | 0.00 | 0.00 | 0.00 | 0.00 | 0.00 | 0.00 | 0.00 | 0.00 | 0.00 |
| 0.4 | 0.00 | 0.00 | 0.00 | 0.00 | 0.00 | 0.00 | 0.00 | 7.20 | 18.26 | 18.59 |
| 0.5 | 0.00 | 0.00 | 0.00 | 0.00 | 0.00 | 0.00 | 0.00 | 0.00 | 0.00 | 0.00 |
| 0.6 | 0.00 | 0.00 | 0.00 | 0.00 | 0.00 | 3.52 | 5.70 | 8.21 | 16.25 | 18.26 |
| 0.7 | 0.00 | 0.00 | 0.00 | 0.00 | 0.00 | 0.84 | 17.92 | 18.76 | 18.76 | 19.60 |
| 0.8 | 0.00 | 0.00 | 0.00 | 0.00 | 10.72 | 16.75 | 16.75 | 20.10 | 22.45 | 22.45 |

Table 6 shows results (error rates) of simulations which have been carried out without using the equalization unit, and is provided for comparison with the above results using the equalization unit. In the simulations for Table 6, equalized signals are digitized by discriminating the signals using a threshold level of 0, and are respectively compared with the non-distorted signal.

TABLE 7

| Results (Error Rates) of Simulations with Construction of FIG. 9 | | | | | | | | | | |
|---|---|---|---|---|---|---|---|---|---|---|
| Delay | Amplitude Distortion A | | | | | | | | | |
| Distortion τ | 0.1 | 0.2 | 0.3 | 0.4 | 0.5 | 0.6 | 0.7 | 0.8 | 0.9 | 1.0 |
| 0.1 | 0.00 | 0.00 | 0.00 | 0.00 | 0.00 | 0.00 | 0.00 | 0.00 | 0.00 | 1.42 |
| 0.2 | 0.00 | 0.00 | 0.00 | 0.00 | 0.00 | 0.00 | 0.00 | 0.00 | 0.00 | 0.00 |
| 0.3 | 0.00 | 0.00 | 0.00 | 0.00 | 0.35 | 2.84 | 6.38 | 4.25 | 4.25 | 4.25 |
| 0.4 | 0.00 | 0.00 | 0.00 | 0.89 | 0.00 | 0.00 | 3.72 | 1.06 | 2.66 | 0.53 |
| 0.5 | 0.00 | 0.89 | 1.06 | 0.00 | 0.00 | 0.00 | 0.00 | 0.00 | 0.00 | 0.00 |
| 0.6 | 0.00 | 0.00 | 0.00 | 0.00 | 0.00 | 0.00 | 3.19 | 10.64 | 14.01 | 22.52 |
| 0.7 | 0.00 | 0.00 | 1.07 | 2.31 | 5.67 | 0.00 | 0.35 | 0.71 | 2.66 | 5.32 |
| 0.8 | 0.00 | 1.60 | 0.00 | 0.00 | 1.06 | 4.26 | 6.38 | 6.38 | 9.04 | 7.62 |

Table 7 shows results (error rates) of simulations which have been carried out for verifying the credibility of the equalization unit 23 in FIG. 9. In the above simulations, the optimum set of the network weights is obtained in the same way as the results of Table 5. The simulations are carried out so that the signal characteristics measuring unit 40a and the equalization network weights control unit 30a cooperate with the equalization unit 23. Then, distorted signals corresponding to the pattern "10" and different from the above model distorted signals are input into the equalization unit 23, and corresponding outputs are compared with the non-distorted signal. The output signals are sampled at the sampling points shown in FIG. 16 by circles, are digitized by discriminating the signals using a threshold level of 0.5, and are respectively compared with the non-distorted signal. From the results of Tables 6 and 7, it is understood that the signal characteristics measuring unit 40a and the equalization network weights control unit 30a effectively cooperate with the equalization unit 23.

We claim:

1. A waveform equalizer for equalizing a distorted signal, comprising:

sampling means for sampling a level of the distorted signal at a predetermined rate;

time series generating means for serially receiving the level of the distorted signal and for outputting in parallel a predetermined number of levels which have been last received;

equalizing neural network means for receiving the levels output by said time series generating means and for generating an equalized signal of the distorted signal based on the levels output by said time series generating means;

distortion characteristic detecting means for detecting a distortion characteristic of the distorted signal;

equalization network weight holding means for holding a plurality of sets of equalization network weights for said equalization neural network means; and equalization network weight selector means for selecting and supplying one of the sets of equalization network weights, according to the distortion characteristic which is detected in said distortion characteristic detecting means, to said equalization neural network means for setting the equalization weights therein.

2. A waveform equalizer according to claim 1, further comprising an optimum equalization network weight obtaining means for obtaining an optimum set of the equalization network weights for each distortion characteristic so that said equalization neural network means outputs a best equalized signal for a distorted signal having the distortion characteristic when the optimum set of the equalization network weights is preset in the equalization neural network means and for supplying the optimum set to said equalization network weight holding means so that said equalization network weight holding means stores the optimum set of equalization network weights for each of the distortion characteristics.

3. A waveform equalizer according to claim 2, wherein said optimum equalization network weight obtaining means comprises:

model non-distorted signal storing means for storing a model signal which is not distorted;

model distorted signal generating means for generating a plurality of model distorted signals being respectively generated from the model signal by distorting the model signal according to a plurality of types of distortion characteristics and for supplying the model distorted signals to said equalization neural network means;

equalization network weight setting means for setting a set of equalization network weights in said equalization neural network means;

output monitoring means for monitoring the output of said equalization neural network means;

equalization network weight modifying means for modifying said set of equalization network weights which are set by said equalization network weight setting means in said equalization neural network means;

learning control means for controlling said equalization network weight setting means and said equalization network weight modifying means based on successive outputs of said equalization neural network means so that a waveform which is made by the successive outputs of said equalization neural network means accords to a waveform of the model signal, to obtain the optimum set of the equalization network weights for each of the plurality of model distorted signals; and memorizing means for memorizing the optimum set of the equalization network weights for each of the plurality of model distorted signals.

4. A waveform equalizer according to claim 3, wherein said optimum equalization network weight obtaining means controls said equalization network weight setting means and said equalization network weight modifying means in accordance with a back propagation method.

5. A waveform equalizer according to claim 2, wherein said optimum equalization network weight obtaining means comprises:

model non-distorted signal storing means for storing a model signal which is not distorted;

simulated equalization neural network means for receiving the model distorted signals, and simulating operation of said equalization neural network means;

model distorted signal generating means for generating a plurality of model distorted signals respectively generated from the model signal by distorting the model signal according to a plurality of types of distortion characteristics, and supplying the model distorted signals to said simulated equalization neural network means;

equalization network weight setting means for setting a set of equalization network weights in said simulated equalization neural network means;

output monitoring means for monitoring the output of said simulated equalization neural network means;

equalization network weight modifying means for modifying the set of equalization network weights which are set by said equalization network weight setting means in said simulated equalization neural network means;

learning control means for controlling said equalization network weight setting means and said equalization network weight modifying means based on successive outputs of said simulated equalization neural network means so that a waveform which is made by successive outputs of said simulated equalization neural network means accords to the waveform of the model signal, to obtain the optimum set of the equalization network weights for each of the plurality of model distorted signals; and memorizing means for memorizing the optimum set of the equalization network weights for each of the plurality of model distorted signals.

6. A waveform equalization according to claim 5, wherein said optimum equalization network weight obtaining means controls said equalization network weight setting means and said equalization network weight modifying means in accordance with a back propagation method.

7. A waveform equalizer according to claim 1, wherein said distortion characteristic detecting means comprises:

time series generating means for serially receiving the level and outputting in parallel a predetermined number of levels which have been last received;

detection neural network means for receiving the levels output by said time series generating means in said distortion characteristic detecting means and for generating a distortion characteristic value of the distorted signal based on the levels output by said time series generating means in said distortion characteristic detecting means.

8. A waveform equalizer according to claim 7, wherein generation of the distortion characteristic value is carried out during a reception of a predetermined training signal.

9. A waveform equalizer according to claim 7, wherein said detection neural network means is a hierarchical neural network comprising:

a predetermined number of input layer units, a plurality of hidden layer units, and at least one output layer unit, said input layer units receiving the levels output by said time series generating means in said distortion characteristic detecting means, each of said hidden layer units inputting the levels at a predetermined combination of said input layer units and outputting a value which is a function of the levels input thereto, and each of said at least one output layer unit inputting the values output by a predetermined combination of the hidden layer units and outputting the distortion characteristic value as a function of the values input thereto, each of said hidden layer units and each output layer unit including linear combination means for obtaining a linear combination of the values input thereto using detection network weights, and non-linear function means for obtaining a non-linear function of the linear combination.

10. A waveform equalizer according to claim 7, further comprising:

optimum detection network weight obtaining means for obtaining an optimum set of detection network weights which is common to all distortion characteristics so that said detection neural network means outputs the distortion characteristics corresponding to the distorted signals when the distorted signals after being sampled by said sampling means, are received by said distortion characteristic detecting means when the optimum set is preset in said detection neural network means; and detection network weight presetting means for presetting the optimum set in said detection neural network means.

11. A waveform equalizer according to claim 10, wherein said optimum detection network weight obtaining means comprises:

a model distorted signal generating means for generating a plurality of model distorted signals each having a certain distortion characteristic, and supplying the model distorted signals to said detection neural network means;

a detection network weight setting means for setting a set of detection network weights in said detection neural network means;

an output monitoring means for monitoring the output of said detection neural network means;

a detection network weight modifying means for modifying said set of detection network weights which are set by said detection network weight setting means in said detection neural network means;

a learning control means for controlling said detection network weight setting means and said detection network weight modifying means based on the output of said detection neural network means to obtain said optimum set of the detection network weights; and a presetting means for presetting the obtained optimum set of the detection network weights in said detection neural network means.

12. A waveform equalizer according to claim 11, wherein said learning control means controls the detection network weight setting means and said detection network weight modifying means in accordance with a back propagation method.

13. A waveform equalizer according to claim 10, wherein said optimum detection network weight obtaining means comprises:

a model distorted signal generating means for generating a plurality of model distorted signals each having a certain distortion characteristic;

a simulated detection neural network means for receiving the model distorted signals, and simulating the operation of said detection neural network means;

a detection network weight setting means for setting a set of detection network weights in said simulated detection neural network means;

an output monitoring means for monitoring the output of said simulated detection neural network means;

a detection network weight modifying means for modifying said set of detection network weights which are set by said detection network weight setting means in said simulated detection neural network means;

a learning control means for controlling said detection network weight setting means and said detection network weight modifying means based on the output of said simulated detection neural network means to obtain said optimum set of the detection network weights; and a presetting means for presetting the obtained optimum set of the detection network weights in said detection neural network means.

14. A waveform equalizer according to claim 13, wherein said learning control means controls the detection network weight setting means and said detection network weight modifying means in accordance with a back propagation method.

15. A waveform equalizer for equalizing a distorted signal, comprising:

sampling means for sampling a level of the distorted signal at a predetermined rate;

time series generating means for serially receiving the level of the distorted signal and for outputting in parallel a predetermined number of levels which have been last received;

equalization neural network means for receiving the levels output by said time series generating means and for generating an equalized signal of the distorted signal based on the levels output by said time series generating means;

distortion characteristic detecting means for detecting a plurality of distortion characteristics of the distorted signal;

equalization network weight holding means for holding a plurality of sets of equalization network weights for said equalization neural network means; and equalization network weight selector means for selecting and supplying one of the sets of equalization network weights, according to the distortion characteristic which is detected in said distortion characteristic detecting means, to said equalization neural network means for setting the equalization weights therein.

16. A waveform equalizer according to claim 15, wherein said distortion characteristic detecting means comprises:

time series generating means for serially receiving the level and outputting in parallel a predetermined number of levels which have been last received;

detection neural network means for receiving the levels output by said time series generating means in said distortion characteristic detecting means and for generating values indicating the distortion characteristics of the distorted signal based on the levels output by said time series generating means in said distortion characteristic detecting means.

17. A waveform equalizer according to claim 16, wherein generation of the distortion characteristic values is carried out during a reception of a predetermined training signal.

18. A waveform equalizer according to claim 16, wherein said detection neural network means is a hierarchical neural network comprising:
- a predetermined number of input layer units,
- a plurality of hidden layer units, and
- a plurality of output layer units, said input layer units receiving the levels output by said time series generating means in said distortion characteristic detecting means, each of said hidden layer units inputting the levels at a predetermined combination of said input layer units and outputting a value which is a function of the levels input thereto, and each of said output layer units inputting the values output by a predetermined combination of the hidden layer units and outputting the distortion characteristics as a function of the values input thereto, each of said hidden layer units and said output layer units including
    - linear combination means for obtaining a linear combination of the values input thereto using detection network weights, and
    - non-linear function means for obtaining a non-linear function of the linear combination.

19. A waveform equalizer according to claim 16, further comprising:
- optimum detection network weight obtaining means for obtaining an optimum set of detection network weights which is common to all distortion characteristics so that said detection neural network means outputs the distortion characteristics corresponding to the distorted signals when the distorted signals after being sampled by said sampling means, are received by said distortion characteristics detecting means when the optimum set is preset in said detection neural network means, and
- detection network weight presetting means for presetting the optimum set in said detection neural network means.

20. A waveform equalizer according to claim 19, wherein said optimum detection network weight obtaining means comprises:
- model distorted signal generating means for generating a plurality of model distorted signals each having predetermined distortion characteristics and for supplying the model distorted signals to said detection neural network means;
- detection network weight setting means for setting a set of detection network weights in said detection neural network means;
- output monitoring means for monitoring the values output by said detection neural network means;
- detection network weight modifying means for modifying the set of detection network weights set by said detection network weights setting means in said detection neural network means;
- learning control means for controlling said detection network weight setting means and said detection network weight modifying means based on the values output by said detection neural network means to obtain the optimum set of the detection network weights; and
- presetting means for presetting the optimum set of the detection network weights in said detection neural network means.

21. A waveform equalizer according to claim 20, wherein said learning control means controls said detecting network weight setting means and said detection network weight modifying means in accordance with a back propagation method.

22. A waveform equalizer according to claim 19, wherein said optimum detection network weight obtaining means comprises:
- model distorted signal generating means for generating a plurality of model distorted signals each having predetermined distortion characteristics;
- simulated detection neural network means for receiving the model distorted signals and for simulating operation of said detection neural network means to produce outputs;
- detection network weight setting means for setting a set of detection network weights in said simulated detection neural network means;
- output monitoring means for monitoring the outputs of said simulated detection neural network means;
- detection network weight modifying means for modifying the set of detection network weights set by said detection network weight setting means in said simulated detection neural network means;
- learning control means for controlling said detection network weight setting means and said detection network weight modifying means based on the outputs of said simulated detection neural network means to obtain the optimum set of the detection network weights; and
- presetting means for presetting the optimum set of the detection network weights in said detection neural network means.

23. A waveform equalizer according to claim 22, wherein said learning control means controls said detection network weights setting means and said detection network weight modifying means in accordance with a back propagation method.

24. A waveform equalizer according to claim 16, wherein the distortion characteristics include an amplitude distortion, a delay distortion, and a phase distortion.

25. A waveform equalizer according to claim 15, wherein said distortion characteristic detecting means comprises:
- time series generating means for serially receiving the level and outputting in parallel the predetermined number of levels which have been last received;
- a plurality of detection neural network means each for receiving the levels output by said time series generating means in said distortion characteristic detecting means and for generating a value indicating one of the distortion characteristics of the distorted signal based on the levels output by said time series generating means in said distortion characteristic detecting means.

26. A waveform equalizer according to claim 25, wherein generation of the distortion characteristic values is carried out during reception of a predetermined training signal.

27. A waveform equalizer according to claim 25, wherein each of said plurality of detection neural network means is a hierarchical neural network comprising:
- a predetermined number of input layer units;
- a plurality of hidden layer units, and
- an output layer unit, said input layer units receiving the levels output by said time series generating means in said distortion characteristic detecting means, each of said hidden layer units inputting the levels at a predetermined combination of said input layer units and outputting a value which is a function of the levels input thereto, and said output layer unit inputting the values output by a predetermined combination of the hidden layer units and outputting the distortion characteristics as a function of the values input thereto, each of said hidden layer units and said output layer unit including
linear combination means for obtaining a linear combination of the values input thereto using detection network weights, and
non-linear function means for obtaining a non-linear function of the linear combination.

28. A waveform equalizer according to claim 26, further comprising:
optimum detection network weight obtaining means for obtaining an optimum set of detection network weights which is common to all distortion characteristics so that said plurality of detection neural network means output the distortion characteristics corresponding to the distorted signals when the distorted signals after being sampled by said sampling means, are received by said distortion characteristic detecting means when the optimum set is preset in said plurality of detection neural network means; and
detection network weight presetting means for presetting the optimum set in said plurality of detection neural network means.

29. A waveform equalizer according to claim 28, wherein said optimum detection network weight obtaining means comprises:
model distortion signal generating means for generating a plurality of model distorted signals each having certain distortion characteristics and for supplying the model distorted signals to said plurality of detection neural network means;
detection network weight setting means for setting a set of detection network weights in said plurality of detection neural network means;
output monitoring means for monitoring the values output by said plurality of detection neural network means;
detection network weight modifying means for modifying the set of detection network weights set by said detection network weight setting means in said plurality of detection neural network means;
learning control means for controlling said detection network weight setting means and said detection network weight modifying means based on the values output to said plurality of detection neural network means to obtain the optimum set of the detection network weights; and
presetting means for presetting the optimum set of the detection network weights to said plurality of detection neural network means.

30. A waveform equalizer according to claim 29, wherein said learning control means controls said detection network weight setting means and said detection network weight modifying means in accordance with a back propagation method.

31. A waveform equalizer according to claim 28, wherein said optimum detection network weight obtaining means comprises:

model distorted signal generating means for generating a plurality of model distorted signals each having predetermined distortion characteristics;
plurality of simulated detection neural network means each for receiving the model distorted signals and for simulating operation of a corresponding one of said plurality of detection neural network means to produce outputs;
detection network weight setting means for setting a set of detection network weights in said simulated detection neural network means;
output monitoring means for monitoring the outputs of said plurality of simulated detection neural network means;
detection network weight modifying means for modifying the set of detection network weights set by said detection network weight setting means in said plurality of simulated detection neural network means;
learning control means for controlling said detection network weight setting means and said detection network weight modifying means based on the outputs of said simulated detection neural network means to obtain the optimum set of the detection network weights; and
presetting means for presetting the optimum set of the detection network weights in said plurality of detection neural network means.

32. A waveform equalizer according to claim 31, wherein said learning control means controls said detection network weight setting means and said detection network weight modifying means in accordance with a back propagation method.

33. A waveform equalizer according to claim 25, wherein said plurality of detection neural network means each receive the levels output by said time series generating means in said distortion characteristic detecting means, generate and output the value indicating the one of the distortion characteristics of the distorted signal, when the value indicating the one of the distortion characteristics of the distorted signal, is within a part, which is assigned to a corresponding detection neural network means, of a whole range of the distortion characteristics to be detected, and generate and output a predetermined value when the value indicating the one of the distortion characteristics is out of the part assigned to the corresponding distortion characteristic detecting means, based on the levels of said time series generating means in the corresponding distortion characteristic detecting means.

34. A waveform equalizer according to claim 33, further comprising:
a plurality of neural network selector means, each provided for a corresponding one of the distortion characteristics detected by said distortion characteristic detecting means, each for receiving outputs of said plurality of distortion characteristics detecting means regarding the corresponding one of the distortion characteristics and for selecting the value output by one of said detection neural network means in said plurality of distortion characteristic detection means; and
a plurality of selector control means, each provided for a corresponding one of said plurality of neural network selector means, each for receiving the value output by each of said detection neural network means in said plurality of distortion characteristic detecting means related to the corresponding one of the distortion characteristics and for controlling the corresponding one of said plurality of neural network selector means based on the value output by said detection neural network means in said plurality of distortion characteristic detecting means, so that the corresponding neural network selector means selects the value output by one of said neural network selector means which does not output the predetermined value and outputs a maximum value of the whole range of said detection neural network means when all outputs of said plurality of distortion characteristic detecting means related to the corresponding one of the distortion characteristics are equal to the maximum value.

35. A waveform equalizer according to claim 34, wherein said selector control means sends selection information on the one of said neural network selector means to said equalization network weight selector means, and wherein said equalization network weight selector means receives the selection information together with the value output by the one of said neural network selector means and selects a corresponding optimum set of the equalization weights based on the selection information and the value output by the one of said neural network selector means.

36. A waveform equalizer according to claim 15, wherein said distortion characteristic detecting means comprises:

time series generating means for serially receiving the level and outputting in parallel the predetermined number of levels which have been last received;

a plurality of detection neural network means each for receiving the levels output by said time series generating means in said distortion characteristic detecting means and for generating and outputting values respectively indicating the distortion characteristics of the distorted signal, when the values indicating the distortion characteristics of the distorted signal, is within a part, which is assigned to a corresponding detection neural network means, of a whole range of the distortion characteristics to be detected, and for generating and outputting a predetermined value when the value indicating one of the distortion characteristics is out of the part assigned to the corresponding distortion characteristic detecting means, based on the levels of said times series generating means in the corresponding distortion characteristic detecting means.

37. A waveform equalizer according to claim 36, further comprising:

a plurality of neural network selector means, each provided for a corresponding one of the distortion characteristics detected by said distortion characteristic detecting means, each for receiving outputs of said plurality of distortion characteristic detecting means related to the corresponding one of the distortion characteristics and for selecting the value output by one of said plurality of detection neural network means; and a plurality of selector control means, each provided for a corresponding one of said plurality of neural network selector means, each for receiving the value output by each of said detection neural network means in said distortion characteristic detecting means related to the corresponding one of the distortion characteristics and for controlling the corresponding one of said plurality of neural network selector means based on the value output by said detection neural network means in said distortion characteristic detecting means related to the corresponding one of the distortion characteristics, so that the corresponding neural network selector means selects the value output by one of said neural network selector means which does not output the predetermined value and outputs the predetermined value of an output range of said detection neural network means when all outputs of said distortion characteristic detecting means related to the corresponding one of the distortion characteristics are equal to the predetermined value.

38. A waveform equalizer according to claim 37, wherein said selector control means sends selection information on the one of said neural network selector means to said equalization network weight selector means, and wherein said equalization network weight selector means receives the selection information together with the value output by the one of said neural network selector means and selects a corresponding optimum set of the equalization weights based on the selection information and the value output by the one of said neural network selector means.

39. A waveform equalizer according to claim 37, wherein the predetermined value is a maximum value of the output range of said detection neural network means.

40. A waveform equalizer according to claim 37, wherein generation of the distortion characteristic values is carried out during reception of a predetermined training signal.

41. A waveform equalizer according to claim 37, wherein each of said detection neural network means is a hierarchical neural network comprising:

a predetermined number of input layer units, a plurality of hidden layer units, and a plurality of output layer units, said input layer units receiving the levels output by said time series generating means in said distortion characteristic detecting means, each of said hidden layer units inputting the levels at a predetermined combination of said input layer units and outputting a value which is a function of the levels input thereto, and each of said output layer units inputting the values output by a predetermined combination of the hidden layer units and outputting the distortion characteristics as a function of the values input thereto, each of said hidden layer units and said output layer units including linear combination means for obtaining a linear combination of the values input thereto using detecting network weights, and non-linear function means for obtaining a non-linear function of the linear combination.

42. A waveform equalizer according to claim 37, further comprising:

optimum detection network weight obtaining means for obtaining an optimum set of detection network weights which is common to all distortion characteristics so that said plurality of detection neural network means output the distortion characteristics corresponding to the distorted signals when the distorted signals after being sampled by said sampling means, are received by said distortion characteristics detecting means when the optimum set is preset in said plurality of detection neural network means, and detection network weight presetting means for presetting the optimum set in said plurality of detection neural network means.

43. A waveform equalizer according to claim 42, wherein said optimum detection network weight obtaining means comprises:

model distorted signal generating means for generating a plurality of model distorted signals each having predetermined distortion characteristics and for supplying the model distorted signals to said plurality of detection neural network means;

detection network weight setting means for setting a set of detection network weights in said plurality of detection neural network means;

output monitoring means for monitoring the values output by said detection neural network means;

detection network weight modifying means for modifying the set of detection network weights set by said detection network weights setting means in said detection neural network means;

learning control means for controlling said detection network weight setting means and said detection network weight modifying means based on the values output by said detection neural network means to obtain the optimum set of the detection network weights; and presetting means for presetting the optimum set of the detection network weights in said detection neural network means.

44. A waveform equalizer according to claim 43, wherein said learning control means the detection network weight setting means and said detection network weight modifying means in accordance with a back propagation method.

45. A waveform equalizer according to claim 42, wherein said optimum detection network weight obtaining means comprises:

model distorted signal generating means for generating a plurality of model distorted signals each having predetermined distortion characteristics;

plurality of simulated detection neural network means each for receiving the model distorted signals and for simulating operation of a corresponding one of said plurality of detection neural network means to produce outputs;

detection network weight setting means for setting a set of detection network weights in said simulated detection neural network means;

output monitoring means for monitoring the outputs of said plurality of simulated detection neural network means;

output monitoring means for monitoring the outputs of said plurality of simulated detection neural network means;

detection network weight modifying means for modifying the set of detection network weights set by said detection network weight setting means in said plurality of simulated detection neural network means;

learning control means for controlling said detection network weight setting means and said detection network weight modifying means based on the outputs of said simulated detection neural network means to obtain the optimum set of the detection network weights; and presetting means for presetting the optimum set of the detection network weights in said plurality of detection neural network means.

46. A waveform equalizer according to claim 45, wherein said learning control means controls said detection network weight setting means and said detection network weight modifying means in accordance with a back propagation method.

47. A detector and waveform equalizer for detecting and equalizing a modulated and distorted signal, comprising:

sampling means for sampling a level of the modulated and distorted signal at a predetermined rate;

time series generating means for serially receiving the level of the modulated and distorted signal and outputting in parallel a predetermined number of levels which have been last received; and equalization neural network means, comprising a neural network in which a set of network weights are preset, for receiving the levels output by said time series generating means and for generating an output signal based on the levels output by said time series generating means and the set of network weights which are predetermined so that the output signal of said neural network is equal to a signal generated by demodulating and equalizing the modulated and distorted signal.

48. A distortion characteristic detector for detecting a distortion characteristic of a distorted signal, comprising:

time series generating means for serially receiving successively sampled levels and outputting in parallel a predetermined number of levels which have been last received;

a plurality of detection neural network means each for receiving the levels output by said time series generating means, for generating and outputting values respectively indicating the distortion characteristics of the distorted signal, when each of the values indicating the distortion characteristics of the distorted signal, is within a part, which is assigned to a corresponding detection neural network means, of a whole range of the distortion characteristics to be detected, and for generating and outputting a predetermined value when any of the values indicating the detection characteristics are out of the part assigned to the corresponding detection neural network means, based on the levels of said time series generating means.

49. A distortion characteristic detector according to claim 48, further comprising:

a plurality of neural network selector means, each provided for one of the distortion characteristics, each for receiving the values output by said plurality of detection neural network means regarding a corresponding one of the distortion characteristics and for selecting the values output by one of said plurality of detection neural network means; and a plurality of selector control means, each provided for a corresponding one of said plurality of neural network selector means, each for receiving the values output by said plurality of detection neural network means regarding the corresponding one of the distortion characteristics and for controlling the corresponding one of said plurality of neural network selector means based on the values output by said plurality of detection neural network means regarding the corresponding one of the distortion characteristics, so that the corresponding one of said neural network selector means outputs the value indicating the distortion characteristic which is within the part of the range, and outputs a maximum value of the range of said detection neural network means when all of the values output by said plurality of detection neural network means regarding the corresponding one of the distortion characteristics are equal to the maximum value.

50. A waveform equalizer according to claim 49, wherein said selector control means sends information on selection of the corresponding one of said neural network selector means to said equalization network weight selector means, and wherein said equalization network weight selector means receives the information together with output from the corresponding one of said neural network selector means, and selects an optimum set of the network weights based on the information and the output from the corresponding one of said neural network selector means.

* * * * *

UNITED STATES PATENT AND TRADEMARK OFFICE
CERTIFICATE OF CORRECTION

PATENT NO. : 5,272,723
DATED : December 21, 1993
INVENTOR(S) : Kimoto et al.

It is certified that error appears in the above-indentified patent and that said Letters Patent is hereby corrected as shown below:

Col. 20, line 43, "equalizing" should be --equalization--.

Col. 21, line 19, "stores the" should be --stores therein the--.

Col. 30, line 55, "detecting" should be --detection--.

Col. 31, line 34, "means the" should be --means controls the--.

Signed and Sealed this

Seventh Day of June, 1994

Attest:

BRUCE LEHMAN

*Attesting Officer*     *Commissioner of Patents and Trademarks*